US005339962A

United States Patent [19]

Sommer, Jr. et al.

[11] Patent Number: 5,339,962

[45] Date of Patent: Aug. 23, 1994

[54] METHOD AND APPARATUS FOR SORTING MATERIALS USING ELECTROMAGNETIC SENSING

[75] Inventors: Edward J. Sommer, Jr., Nashville; Michael A. Kittel, Unionville; James R. Peatman, Nashville, all of Tenn.

[73] Assignee: National Recovery Technologies, Inc., Nashville, Tenn.

[21] Appl. No.: 777,718

[22] Filed: Oct. 21, 1991

Related U.S. Application Data

[63] Continuation-in-part of Ser. No. 605,993, Oct. 29, 1990, Pat. No. 5,260,576.

[51] Int. Cl.[5] .......................... B07C 5/00; G01N 21/00

[52] U.S. Cl. .......................... 209/576; 209/577; 209/589; 209/639; 250/341; 250/349; 250/359.1; 356/432; 378/51

[58] Field of Search .......................... 209/522, 524, 576–579, 209/585, 587–589, 639; 250/223 R, 225, 341, 349, 358.1, 359.1; 356/432; 378/51

[56] References Cited

U.S. PATENT DOCUMENTS

| | | | |
|---|---|---|---|
| 3,435,950 | 4/1969 | Suverkrop | 378/51 X |
| 3,545,610 | 12/1970 | Kelly et al. | 209/585 X |
| 3,655,964 | 4/1972 | Slight | 378/51 X |
| 3,980,180 | 9/1976 | Jamieson | 356/432 X |
| 4,212,397 | 7/1980 | Bockelmann | 209/589 |
| 4,462,495 | 7/1984 | McKinley et al. | 209/576 X |
| 4,623,997 | 9/1986 | Tulpule . | |
| 4,657,144 | 4/1987 | Martin et al. | 209/639 X |
| 4,884,386 | 12/1989 | Canlo | 53/438 |
| 4,909,930 | 3/1990 | Cole | 209/587 X |
| 5,101,101 | 3/1992 | Sawamura | 250/223 R |
| 5,134,291 | 7/1992 | Ruhl, Jr. et al. | 209/587 X |

FOREIGN PATENT DOCUMENTS

| | | | |
|---|---|---|---|
| 0064842 | 11/1982 | European Pat. Off. | 209/577 |
| 325558A2 | 7/1989 | European Pat. Off. . | |
| 353457A2 | 2/1990 | European Pat. Off. . | |
| 2188727 | 10/1987 | United Kingdom | 209/576 |
| 2198242 | 6/1988 | United Kingdom . | |

OTHER PUBLICATIONS

Patent Abstracts of Japan, vol. 13, No. 590 (P584), Dec. 26, 1989 & JP-A-1 253 017 (NEC Corp.) Sep. 10, 1989 (Abstract).

Patent Abstracts of Japan, vol. 14, No. 538 (P1136), Nov. 28, 1990 & JP-A-2 228742 (Mitsubishi Electric Corp.) Nov. 9, 1990 (Abstract).

Patent Abstracts of Japan, vol. 13, No. 361 (kP917), Aug. 11, 1989 & JP-A-1 119838 (Mitsubishi Electric Corp.) Nov. 5, 1989 (Abstract).

Development Contract with Vinyl Institute.

R&D Letter of Agreement With Reprise Limited.

Trip Report re: Reprise.

Oct. 16, 1992 NRT letter.

*Primary Examiner*—D. Glenn Dayoan
*Assistant Examiner*—Tuan N. Nguyen
*Attorney, Agent, or Firm*—Foley & Lardner

[57] ABSTRACT

An automated interrupt driven system which employs a circular buffer is used to sort materials based on differing electromagnetic radiation absorption and penetration characteristics. The system has a conveyor and a source of electromagnetic radiation which radiates materials travelling along the conveyor. A controller samples detector outputs at various times to evaluate the absorption and penetration characteristics of the materials to be sorted, based on a plurality of samples. Portions of the materials are ignored to obtain accurate readings from the detectors. Based on the detected penetration and absorption characteristics, the controller activates ejection mechanisms causing materials of different compositions to be deposited into different bins. The controller executes interrupts to cause detection, ejection, testing, and system history maintenance at required times. The circular buffer contains indices which point to various locations which are programmed in memory to trigger and perform specific events. The location of the indices in the circular buffer is used to control event timing, such as activating and deactivating the ejection mechanisms. This configuration allows several events to be executed simultaneously by moving to the next location in the circular buffer while the event indicated by the index in the previous location continues in progress.

35 Claims, 26 Drawing Sheets

DETECTOR AND TRANSDUCER
CIRCULAR DATA BUFFERS

METHOD AND APPARATUS FOR SORTING MATERIALS USING ELECTROMAGNETIC SENSING

BACKGROUND OF THE INVENTION

This is a continuation-in-part of U.S. patent application Ser. No. 07/605,933 filed Oct. 29, 1990 now U.S. Pat. No. 5,269,576. This invention was made with Government support under Contract No. 68D80025 having an effective date of Aug. 18, 1988, awarded by the Environmental Protection Agency. The Government has certain rights in this invention.

The disclosed invention classifies materials by utilizing the tendency of penetrating electromagnetic radiation to pass through differing materials with differing levels of attenuation within the materials according to their chemical properties. The invention provides for separation of the differing materials from each other according to the amount of radiation passing through them. More specifically, penetrating electromagnetic radiation is used to simultaneously scan multiple material items as they pass through a region of radiation. Analysis of the measured radiation passed through differing portions of the body of each item is used to classify each item and activate means for separating from each other items which have differing chemical properties.

It is well known that for materials having similar thicknesses, those materials comprised of elements having a lesser atomic number generally allow a greater degree of penetrating electromagnetic radiation to pass through them than do those materials comprised of elements having a greater atomic number. Additionally, it is also well known that for materials having similar chemical properties, those materials of lesser thickness generally allow a greater degree of penetrating electromagnetic radiation to pass through them than do those materials of greater thickness. Therefore materials of differing chemical properties can be selected according to the amount of penetrating electromagnetic radiation passing through them, if differences in thicknesses of the materials have relatively less effect on the transmission of penetrating electromagnetic radiation through them than do differences in chemistry.

In the recycling of waste or secondary materials it is very useful to be able to separate mixtures of materials into usable fractions, each having similar chemical properties. For instance it is useful to separate plastic materials from glass materials, to separate metals from nonmetals, to separate differing plastics from each other, and to separate dense materials from less dense materials. There are many other such useful separations practiced in industry using many different methods which are too numerous to enumerate herein.

It has been found that in separating mixtures of materials for recycling, the disclosed invention is very effective at distinguishing and separating items of differing chemical composition. Mixtures containing metals, plastics, textiles, paper, and/or other such waste materials can be separated, since penetrating electromagnetic radiation typically passes through the items of different materials to differing degrees. Such mixtures occur frequently in the municipal solid waste recycling industry and in the secondary materials recycling industries. An example is the separation of aluminum beverage cans from mixtures containing such cans and plastic containers. Such mixtures are commonplace in curbside recycling programs. Another example is the separation of chlorinated plastics (a source of corrosive gasses when burned) from a municipal solid waste mixture to provide a less polluting fuel for municipal waste incineration.

It has also been found that the invention is useful for separating chlorinated plastics from mixtures containing nonchlorinated plastics, since it has been found that chlorinated plastics typically allow less transmission of penetrating electromagnetic radiation than do nonchlorinated plastics. Such separation renders each of these plastics more valuable for recycling. Such mixtures of plastics are commonplace in municipal waste recycling programs. Until now such separations have been performed using methods which are cumbersome and slow, thereby limiting their usefulness. For instance in the United States, the manufacturers of plastic containers for consumables have recently begun molding a numerical identification code into the base of the containers. The code indicates chemical composition, such as polyolefins, polyesters, or vinyls (polychlorinated plastics). Using these codes, the plastics can be manually hand-sorted from each other. However, this method is slow, labor intensive, and expensive and has not found widespread use for these reasons.

There exist three known processes for automated separation of chlorinated plastics from mixtures of plastics according to their response to electromagnetic radiation. One of these processes is disclosed in European patent application No. 88107970.1 of Giovanni, filed May 18, 1988, and published on Nov. 23, 1988. Another process is disclosed in U.S. Pat. No. 4,884,386, issued to Gulmini Carlo on Dec. 5, 1989. The third process is known as the Rutgers process.

Each process requires that items in the mixture be placed singly into a radiation chamber, following which placement measurements are made to classify the plastic item according to its response to an electromagnetic radiation beam. Subsequently the plastic item is directed to a destination according to its chemical composition. After this sequence is completed, another plastic item is fed into the radiation region and the sequence is repeated. This requirement for operation with single items necessitates elaborate equipment for singly selecting items from the mixture and placing them one at a time into these separators. Furthermore, since the plastics are required to be singly classified one after another, the methods are limited in throughput because of the finite time required to execute the sequence for each item.

Typical plastic containers for consumables are manufactured with thicker walls at the neck and base than in their central portions. Such plastic containers, when flattened for storage or shipping reasons during recycling, typically contain folds incurred during the flattening process. Necks, caps, bases and folds give rise to significant variations in total material thickness presented to a penetrating electromagnetic radiation beam. It has been found by the inventors that utilizing measures of radiation transmission through the neck, cap, base, or a folded region of a plastic container can give inaccurate results in attempting to classify the chemical composition of the container due to these variations in total material thickness.

SUMMARY OF THE INVENTION

It has been found that the disclosed invention surmounts the above mentioned limitations and provides efficient high volume separations by allowing plastic materials to be fed multiply and in a continuous manner without regard to orientation into a common region of penetrating electromagnetic radiation. Simultaneous measurements are made on all items as they move through the region of radiation, in order to distinguish and classify each plastic item according to its chemical properties and thicknesses. The items are then simultaneously directed to different destinations, according to their chemical properties and thicknesses. As a result of this capability of operation with multiple items, the disclosed invention operates at a significantly greater throughput rate than the aforementioned processes and requires no specialized means for singly placing materials into the radiation region.

We have found that, in practice, taking a measurement through only a relatively thin cross section of an item requires detailed knowledge of the geometry and orientation of the item (such as a container). Accordingly, placement of an item between a radiation source and a radiation detector, such that radiation passing through only a relatively thin cross section is measured, requires sophisticated and expensive materials handling means. However, our invention overcomes this limitation. We have found that use of high speed electronic signal processing circuitry to analyze a group of separate measurements taken through differing portions of the body of an item to be classified as it passes between the radiation source and radiation detector allows selection of only those measurements of greater transmission rate for use in classifying the item. Therefore specialized placement and orientation of the item between the source and detector is not required.

Accordingly it has been found that the method of the disclosed invention of acquiring multiple separate measurements of radiation transmitted through different portions of the body of an item to be classified and using high speed signal processing circuitry to identify and use only those measurements of highest transmission rate through the item to classify the item overcomes uncertainties in classification arising from variations in total thickness of the item. It is noted that with our invention other signal processing algorithms which correlate the separate measurements taken on an item could also be used such as, for example, averaging the measurements or averaging the selected measurements.

The disclosed invention employs an improved method for distinguishing, classifying and separating mixtures of material items which comprises:

(a) conveying the items multiply and in a continuous manner through a radiation region or zone of penetrating electromagnetic radiation, (b) irradiating the multiple items simultaneously with penetrating electromagnetic radiation as the items pass through the radiation region, (c) simultaneously acquiring for the multiple items a group of separate measurements for each item, each measurement within a group being a measurement of the amount of penetrating electromagnetic radiation passing through a different portion of the body of an item, and (d) simultaneously directing the multiple items each to a destination determined by analysis of the group of measurements of the amount of transmission of penetrating electromagnetic radiation passing through each item.

BRIEF DESCRIPTION OF THE DRAWINGS

The invention shall be described with particularity by reference to the appended drawings in which:

FIG. 4-B is a graphic illustration similar to FIG. 4-A illustrating a crushed PVC (polyvinyl chloride) container, and a graph illustrating corresponding measurements of transmitted radiation along the container.

DESCRIPTION OF THE EMBODIMENTS

Figure 1:
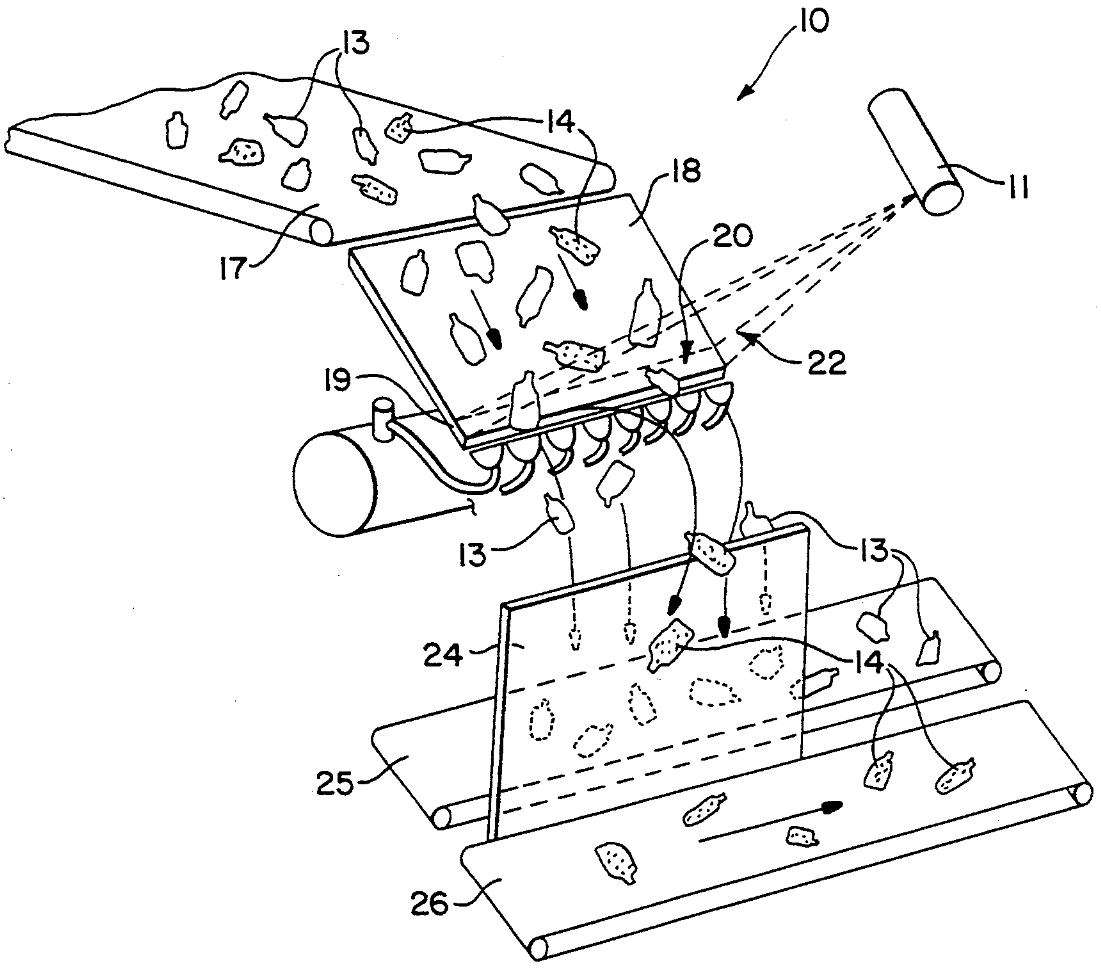
FIG. 1 is a front perspective view of the apparatus for the separation of materials using penetrating electromagnetic radiation, made in accordance with this invention, in which two sets of material items are being processed and separated.

According to the invention, materials having different electromagnetic radiation absorption and penetration characteristics are separated. First, the materials are conveyed along a plurality of channels from at least one inlet toward a plurality of outlets through a source of electromagnetic radiation. Portions of the materials conveyed are radiated with the electromagnetic radiation. A predetermined sequence of detectors is periodically polled. Each detector corresponds to a channel. The polling includes sampling for a predetermined sample time with the detectors the electromagnetic absorption and penetration characteristics of the material portions radiated. In response to the electromagnetic radiation absorption and penetration characteristics measured by the detectors, material ejection mechanisms are activated at different times, so that materials having different electromagnetic radiation absorption and penetration characteristics are ejected at different times and locations on the conveyor into different sorting bins. In addition, the system allows simultaneous operation of different system mechanisms, so that operations of the material ejection mechanisms can be verified prior to polling the channel detector corresponding to the material ejection mechanism. Thus, it is not necessary to verify operation of all material ejection mechanisms before beginning polling. It is only necessary that the corresponding channel be verified prior to initiation of polling in that channel.

The ejection mechanisms are air pressure ejectors which produce air pressure data that can be measured by sensors and stored in a sequence identical to the sequence of the detectors polled. A fault can be indicated if the air pressure data measured and stored is less than a predetermined minimum.

It is also useful to ignore a portion of each item of material to be separated. Therefore, an ignore time is counted from a time when a detection is made, so that although sampling takes place during this ignore time, the data is set aside for consideration only in special cases. One such case is where the material sampled is of too small a size to permit entry into a sample interval following the ignore time. When sampling is initiated after the ignore time, the outputs of the detectors are sampled a plurality of times during the sample interval and a sample average is determined from the detector outputs and a count of the number of samples during the sample interval. The average is compared to a predetermined material threshold. This material threshold is a ratio equal to a predetermined amount of radiation transmitted through the material divided by the amount of radiation transmitted without the material present in the path between the radiation source and the detector. When the average is less than the predetermined material threshold, an air-on index is set to activate the air ejection mechanism at a time and for a duration based on the sample count, the ignore count, the amount of time it takes for the material to go from the detectors to the air pressure ejection mechanism and a response time of a solenoid which activates the individual air ejection mechanisms. By measuring and storing air pressure data from each ejection mechanism in a sequence identical to the sequence of the detectors polled, a fault can be indicated if the air pressure data measured is less than a predetermined minimum.

The system also includes a processor which controls the system operation and performs an initialization sequence. In the initialization sequence, variables are initialized and the number of detectors is compared with the number of ejection mechanisms for one to one correspondence. High and low limits of detection and ejection mechanisms can be tested and operation of fault indicators verified In addition, the total operation time, a system history and a record of errors can be provided. This is accomplished by periodically interrupting detection processing to store such information.

To carry out these functions, the system has an acceleration slide, an electromagnetic radiation source arranged above the acceleration slide, a plurality of detectors, with each detector corresponding to a channel, for measuring electromagnetic absorption and penetration characteristics of material portions radiated, and a means for periodically polling a predetermined sequence of the detectors. Polling means includes a sampler which is arranged to sample the detectors a plurality of times for a sample time. Ejection mechanisms, e.g., air pressure ejectors, are activated by an activating means at different times as the materials are conveyed so that materials with different electromagnetic radiation absorption and penetration characteristics are ejected at different locations on the acceleration slide into different sorting bins. Control is achieved with a processor which maintains a current index. The current index represents a pointer in a circular buffer and identifies a location in memory where current information is stored.

Figure 2:
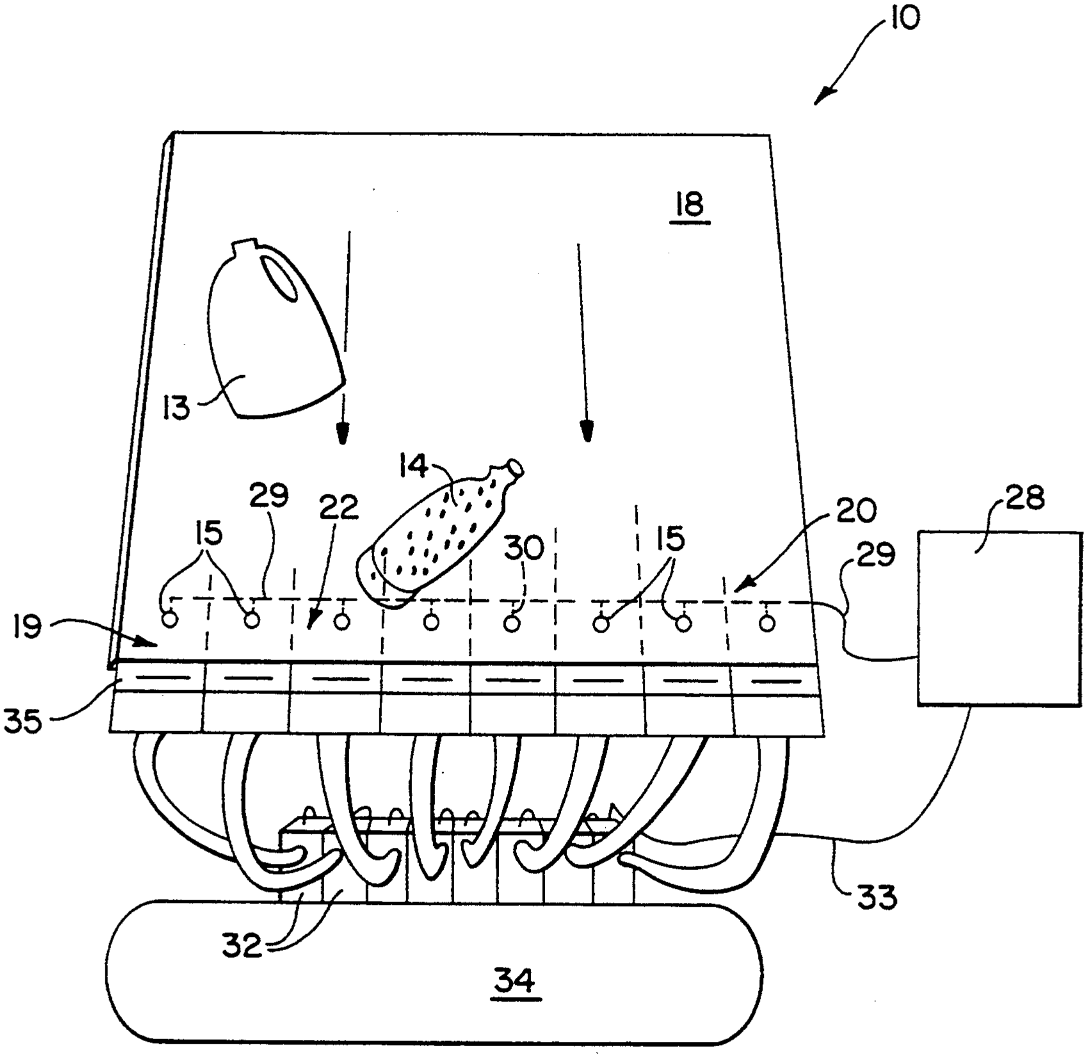
FIG. 2 is an enlarged front elevation of the apparatus disclosed in FIG. 1, illustrating a single item of the first set and a single item of the second set being moved over the slide conveyor.
Figure 3:
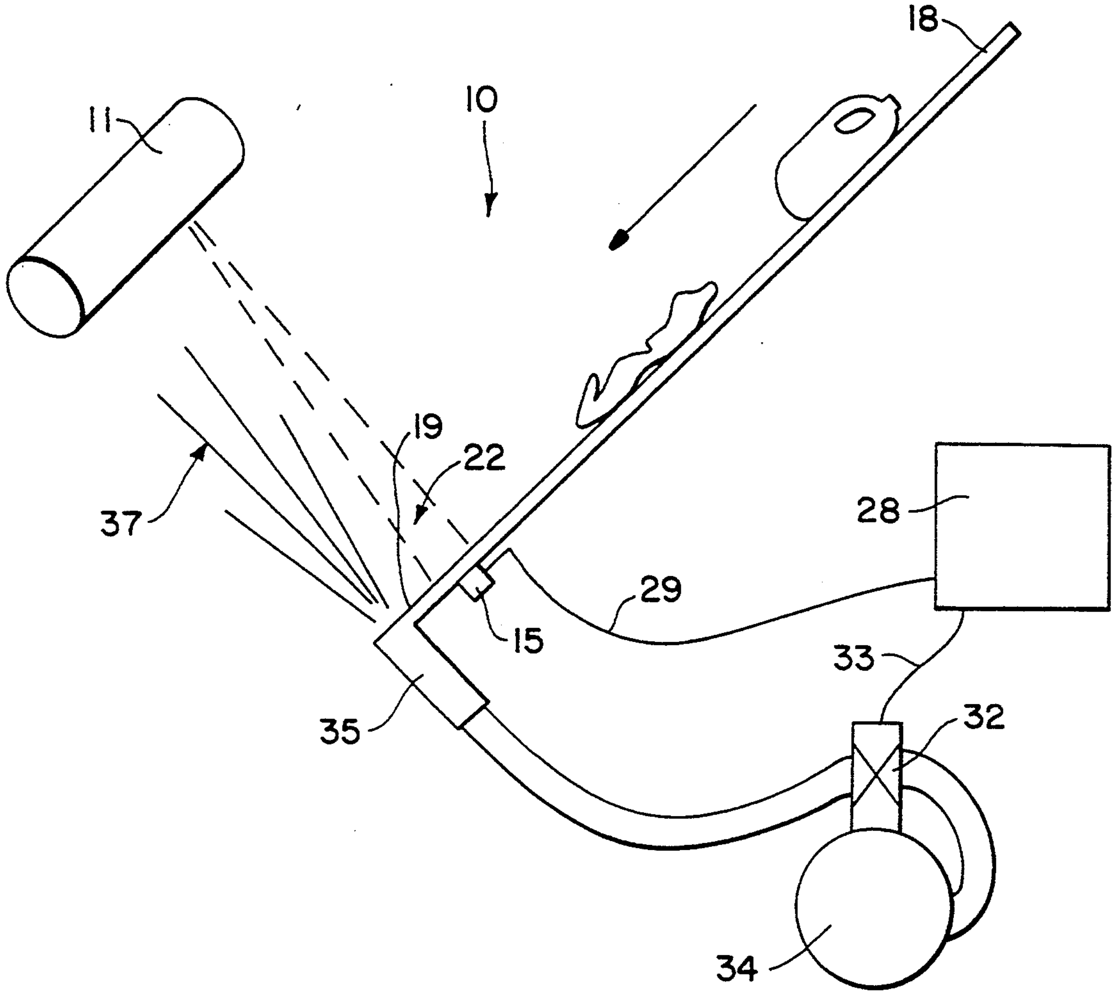
FIG. 3 is a side elevation of the apparatus disclosed in FIG. 2, illustrating one uncrushed item of one set and one crushed item of a second set of the material items moving over the slide conveyor.

In the disclosed apparatus 10 in FIGS. 1-3, the source of penetrating electromagnetic radiation may be either an X-ray source, a microwave source, a radioactive substance which emits gamma rays, or any other source of electromagnetic radiation, such as the X-ray tube 11, whose rays penetrate through a class of materials to be separated from a mixture of materials. The preferred wavelength of radiation to be used depends upon the physical and chemical properties of the items 13 and 14 to be separated, since the amount of transmission through the items is dependent upon these factors. It is preferred to use wavelengths which result in transmissions of 10% to 90% of incident radiation passing through the items 13 and 14 to be separated, although other wavelengths could be used. Radiation detectors 15 should be selected to be optimally sensitive to the radiation wavelengths used. The detectors should be of high speed response, preferably with a response time of one millisecond or less to allow for accurate measurement with high throughput rates of items to be separated.

FIG. 1 is an illustration of the apparatus 10 in operation. A mixture of two types of materials 13 and 14 to be separated are delivered to the apparatus 10 via a feed conveyor 17. Conveyor 17 is selected so as to deliver the mixture of materials 13 and 14 in uniform fashion across the width of an acceleration slide 18. The acceleration slide 18 is positioned at a declining angle to the horizontal such that the mixture of items 13 and 14 upon it will move down the slide 18 under the influence of gravitational force, preferably accelerating to increasing speeds as the items 13 and 14 progress down the slide 18, causing the items to spread during their descent. As shown in FIG. 2, at the lower end portion 19 of the slide 18 is an array 20 of radiation detectors 15 positioned so that they span the width of the slide 18. The detectors 15 are spaced apart so that any item 13 or 14 in the mixture to be separated cannot pass over the array 20 without passing over at least one detector 15.

Positioned above the detector array 20, as illustrated in FIG. 1, is a collimated source 11 of penetrating electromagnetic radiation. Source 11 delivers a sheet-like beam of radiation which falls incident upon the width of the acceleration slide 18 in an area strip or radiation zone 22 containing the radiation detector array 20, such that as items 13 and 14 of the mixture pass through this beam. They pass between the radiation source 11 and the detector array 20. Spaced downstream from the lower end 19 of the acceleration slide 18 is a splitter 24 for segregating separated materials 13 and 14, which then fall onto conveyors 25 and 26 placed on the two opposite sides of the splitter 24 for conveyance away from the apparatus 10 to remote discharge areas, not shown. Of course additional splitters and sorting bins or other suitable discharge apparatus can be employed.

Each detector 15 in the array 20 is connected to an electronic signal processing circuitry 28 as depicted in FIGS. 2 and 3, through leads 29 and branch leads 30. The circuitry 28 is connected to an electromagnetic air valve 32 through lead 33. The air valve 32 connects a reservoir 34 of compressed gas or air to an air nozzle 35 located directly downstream from each corresponding detector 15. Each detector 15, in combination with its associated circuitry, is capable of operating independently of any other detector 15, together with its corresponding circuitry. Each air valve 32 and air nozzle 35 combination is capable of operating independently of any other air valve 32 and its corresponding air nozzle 35. In the apparatus 10 shown in FIG. 3, each detector 15 and its associated circuitry is connected to a single air valve 32 and combination air nozzle 35, although in practice one or more adjacent detectors 15 and its associated circuitry may be connected to one or more air valves 35, in order to feed one or more air nozzles 35 which span the width of the corresponding adjacent detector 15.

In operation, signals are picked up by the detectors 15 and transmitted to signal acquisition, analog, and digital conversion circuitry 505. These signals are then transmitted to a microprocessor analyzer, such as controller 513, to identify the region of least thickness in the materials treated. The analyzer then determines if that signal meets the criteria for the material to be selected and energizes ejection mechanisms, such as air valve circuitry to either activate the air valve 32 or not.

As a material item 13 or 14 to be separated passes over the detector array 20 it passes between the radiation source 11 and one or more detectors 15. Each detector 15 takes multiple measurements of the intensity of radiation passing through differing portions of the body of the item 13 or 14 as it passes over the detectors 15. These measurements are analyzed by the electronic signal processing circuitry 28 connected to each detector 15, applying a selection algorithm to identify the item as being of Type A or Type B, such as 13 or 14. If, in the case depicted, the item 13 is identified as Type A, no action is taken and the item 13 falls off the end of the slide 18 and onto the Type A item conveyor 25. If the item identified as 14 is Type B, then the corresponding air valve or air valves 32 are activated at the appropriate time to cause an air blast 37 (FIG. 3) to be emitted from the appropriate air nozzles 35, so as to eject the item 14 away from the end of the slide 18 and over the splitter 24 so that the item 14 falls onto the Type B item conveyor 26.

As many items 13 or 14 as there are air nozzles 35 can be separated simultaneously in this manner. In the apparatus 10 depicted, up to eight items can be separated simultaneously, since eight nozzles 35 are illustrated in the drawings. We have found that each detector 15, circuitry 28, air valve 32, and air nozzle 35 combination currently used can operate upon as many as ten items per second. Thus, the illustrated embodiment of the apparatus 10 is ultimately capable of classifying up to eighty containers per second.

Figure 4A:
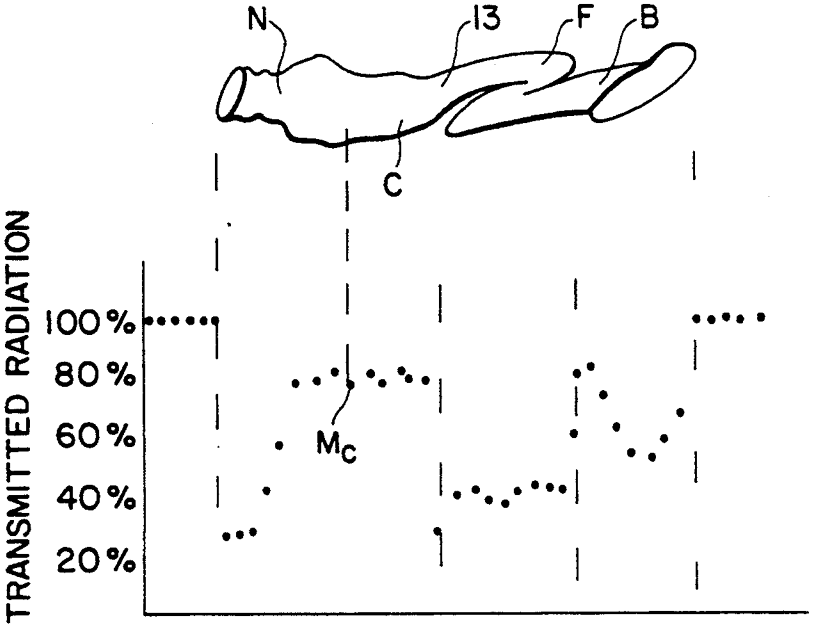
FIG. 4-A is a graphic illustration of a crushed polyester plastic container, typical of a first set of material items to be classified, and a graph illustrating the transmitted radiation measurements at various longitudinal portions of the container.
Figure 4B:
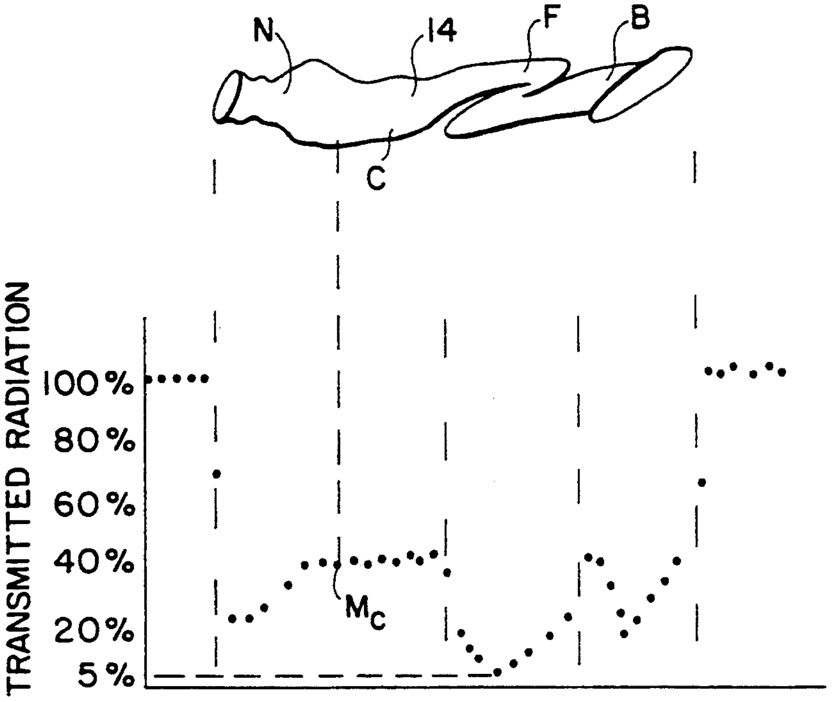

FIG. 4-A depicts a typical flattened polyester plastic container 13 (Type A) which has a neck N, central portion C, and base B, and which contains a fold F caused by the flattening process. A typical graph of measurements of incident penetrating electromagnetic radiation transmitted through corresponding portions of the container is shown below the container 13 and positioned such that a measurement of transmitted radiation shown at a point along the graph corresponds to the portion of the container directly above the graph. (For example, measurement Mc is vertically below a point on central portion C.) It can be seen from the graph that in this example, radiation transmission rates of from 20% to 80% can be measured depending upon which portion of the container the transmission is being measured through. Similarly from the graph of FIG. 4-B of a typical PVC plastic container of similar geometry it can be seen that measurements of transmission rate from 5% to 40% can be obtained.

A problem arises if only a threshold comparator (such as disclosed in Giovanni) is used in an attempt to distinguish between the polyester and PVC containers. In order to reliably distinguish the PVC container 14 in the example of FIG. 4-B, a classification threshold set at less than 40% transmission would risk failing to recognize the container as PVC if the measurement used was taken through a relatively thin cross section such as through an unfolded central portion of the container (which can easily occur if the container passes the radiation detector in an orientation such that the detector does not see a neck, cap, base, or fold). However, using a threshold comparator with the above mentioned 40% classification threshold or greater for PVC when examining a polyester container 13 as in FIG. 4-A may cause the polyester container 13 to be misclassified as PVC if the container passes the detector in an orientation such that the detector sees a neck, cap, base, or fold, since some of these measurements show a transmission rate of less than 40%, which would trip the threshold comparator by its nature of operation.

Because of possible misclassifications arising from these types of signal overlap, we have determined that in general the most reliable measurements for making a classification are those measurements taken through those portions of the body of an item to be classified which exhibit the greatest rates of transmission of radiation through the item (such as those taken through a relatively thin cross section such as through an unfolded central portion of the container).

A processor, such as either a central or distributed master computer, can implement system operation in accordance with the flow diagrams shown in FIGS. 6–11. Detection and ejection circuitry may also be located on one or more remote boards, which may include remote processors or computers. FIGS. 6–11 illustrate a system with four channels and a corresponding number of detectors and material ejectors. However, this is by way of illustration and not limitation, as it will be clear to those of ordinary skill that any number of channels and corresponding detectors and material ejectors can be employed.

Figure 5:
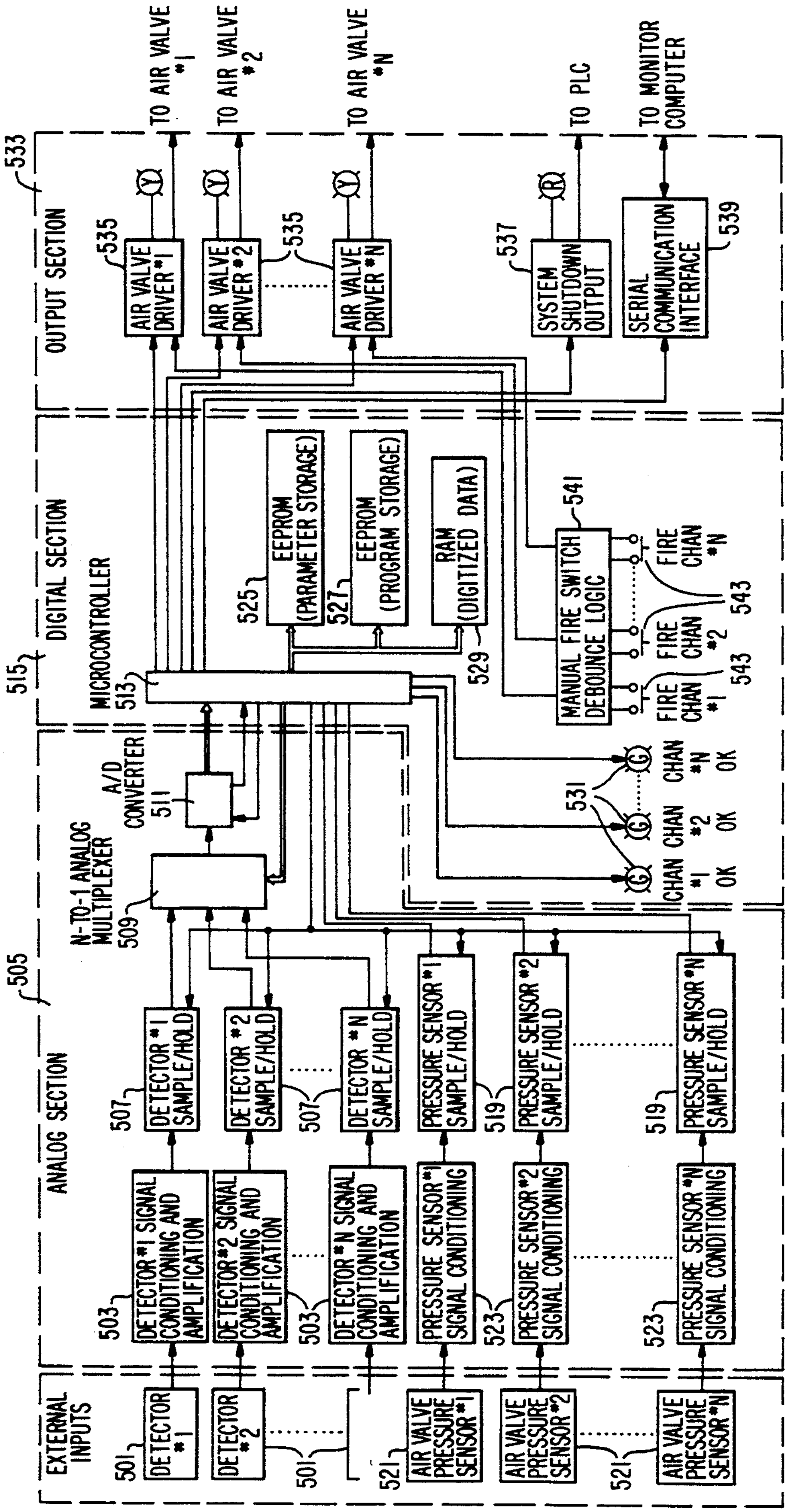
FIG. 5 is a block circuit diagram of the electronic signal processing circuitry.
Figure 6A:
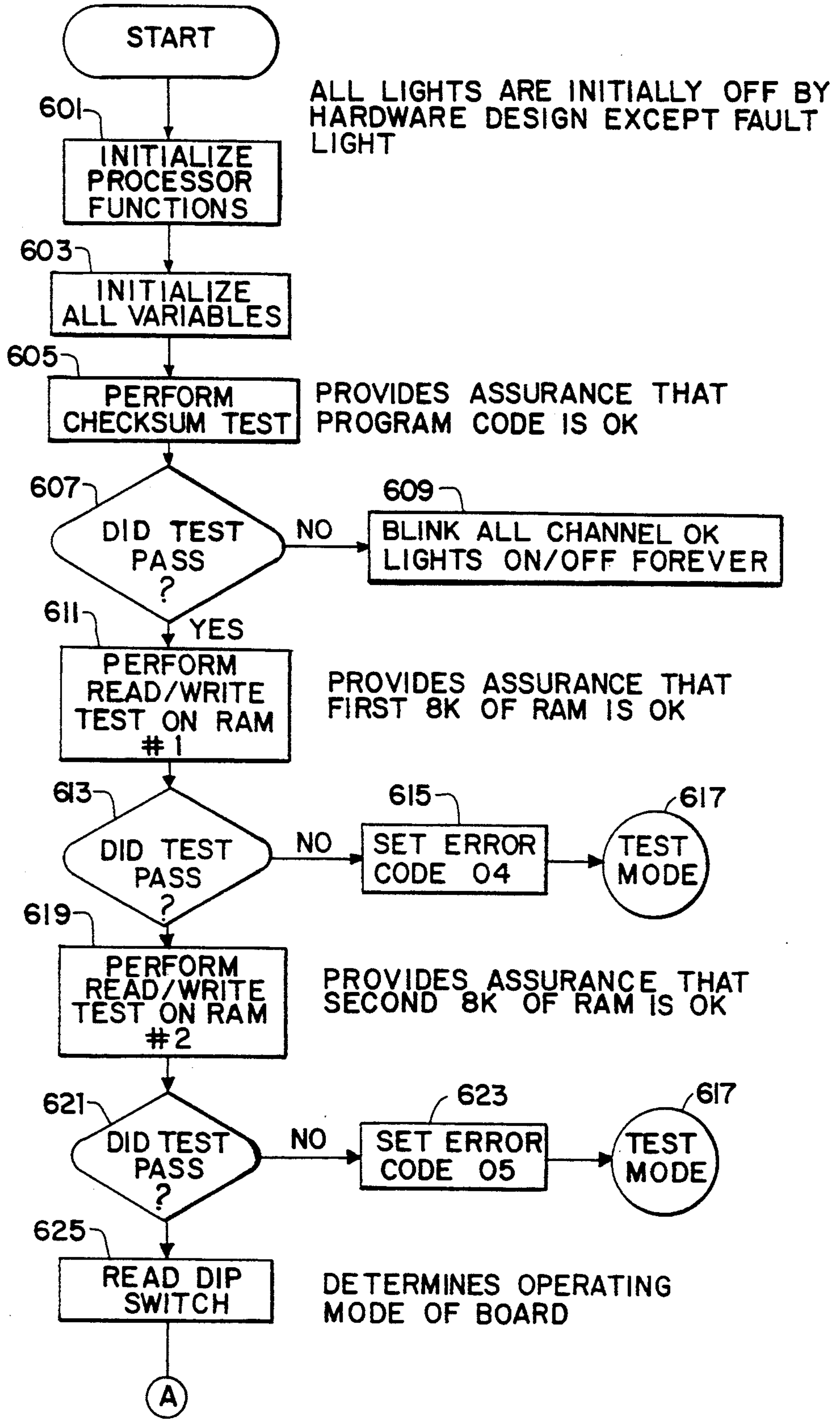
FIGS. 6*a*–6*h* illustrate the steps performed in an initialization sequence of a system according to the invention.
Figure 6B:
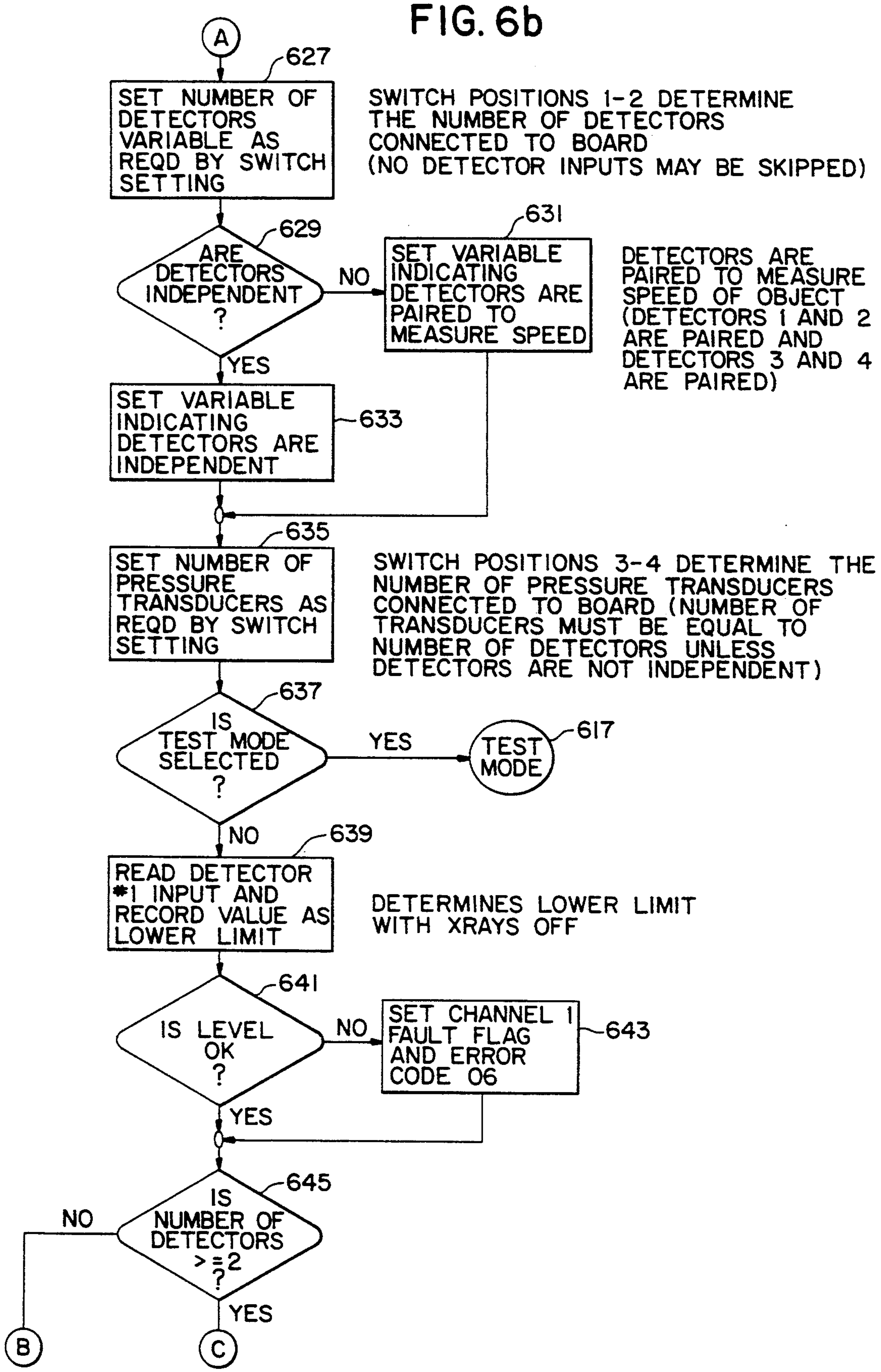
Figure 6C:
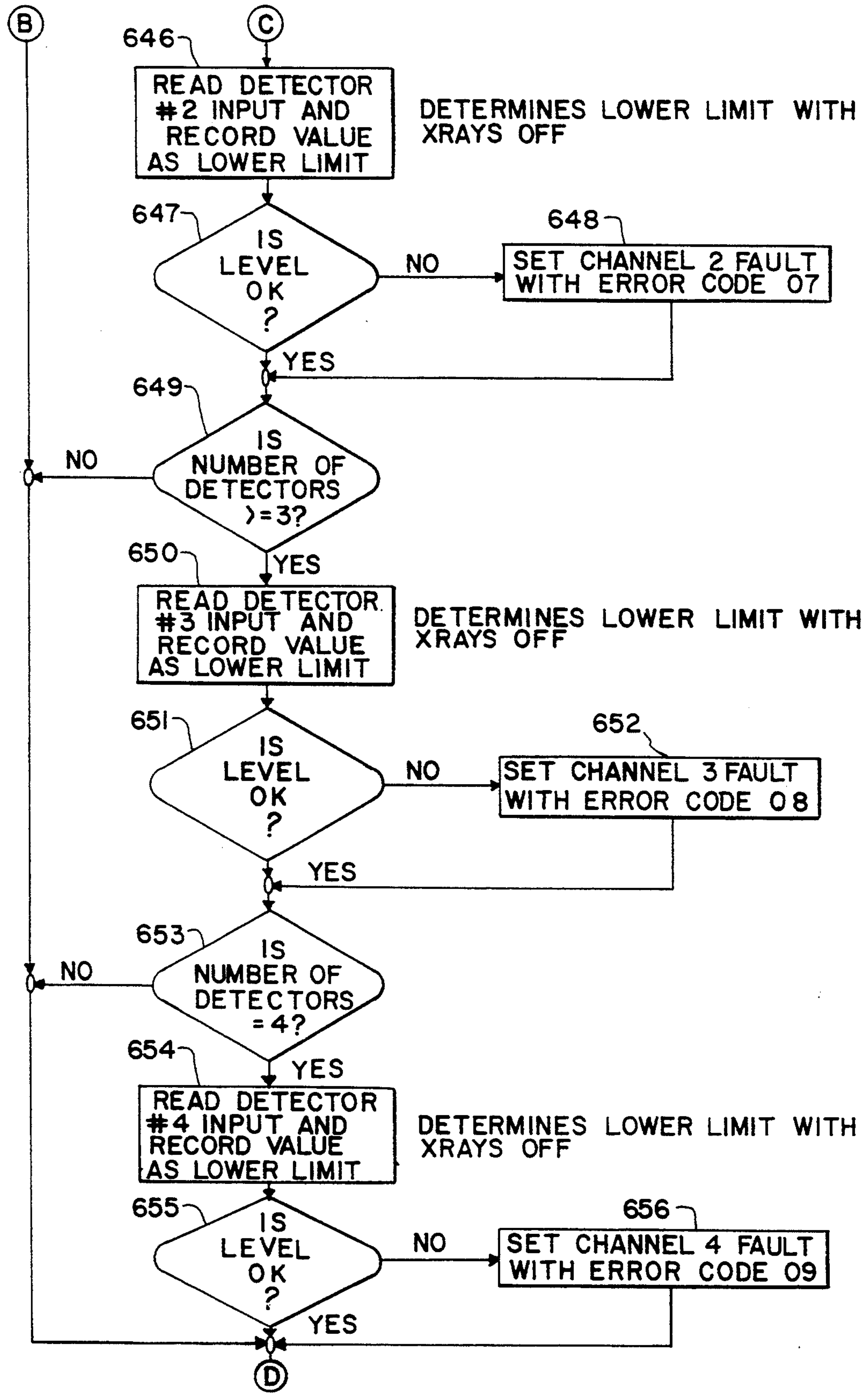
Figure 6D:
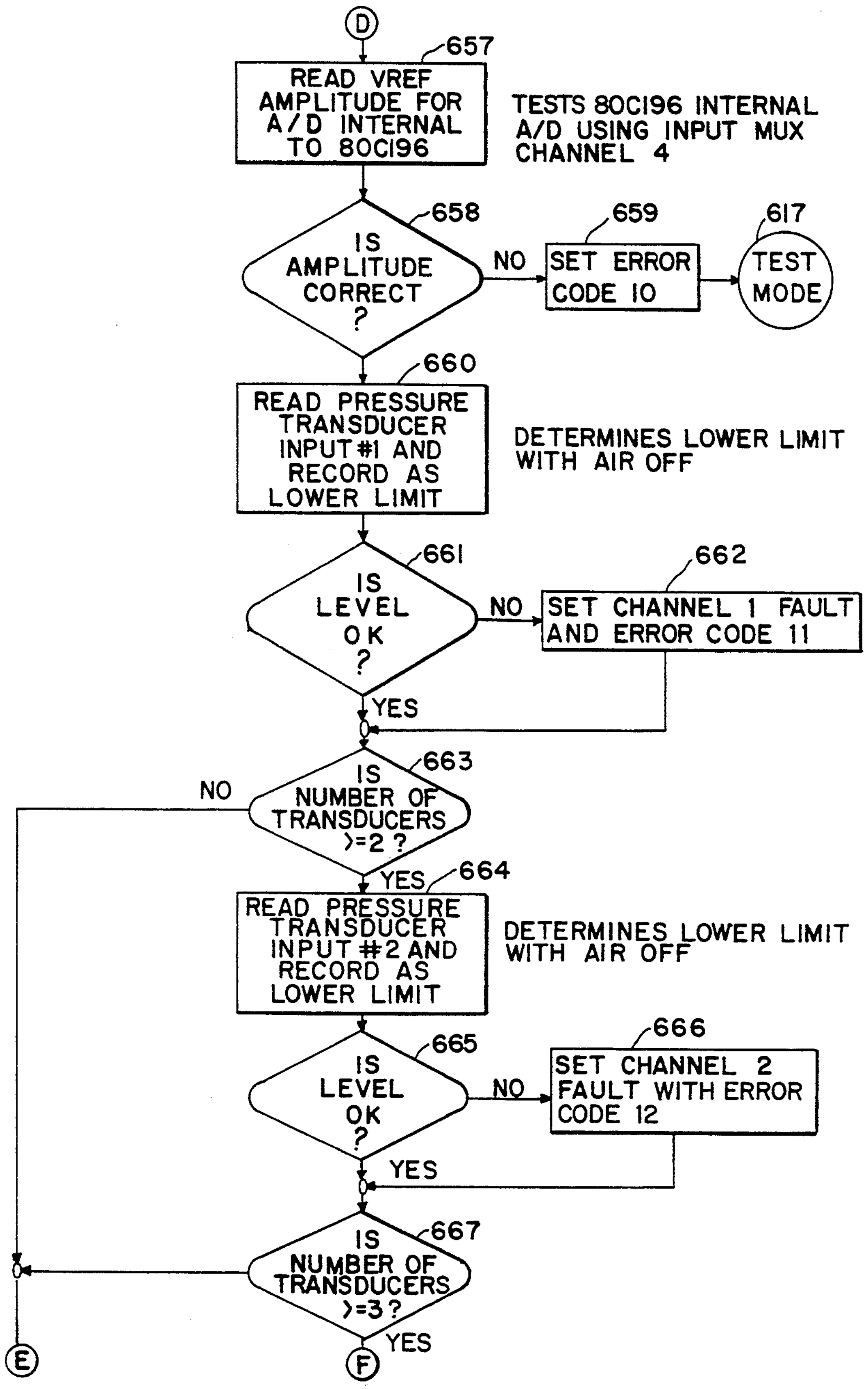
Figure 6E:
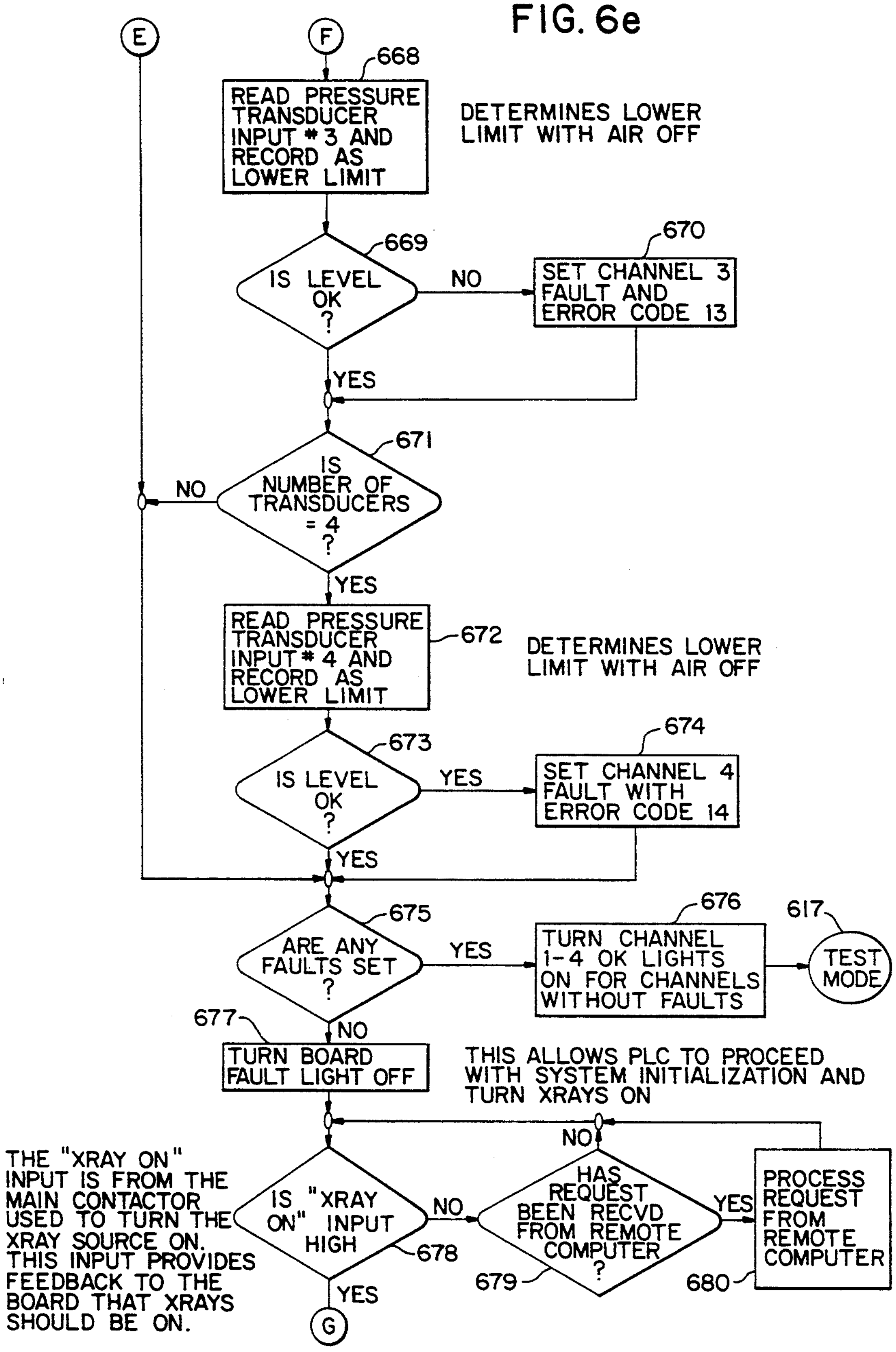
Figure 6F:
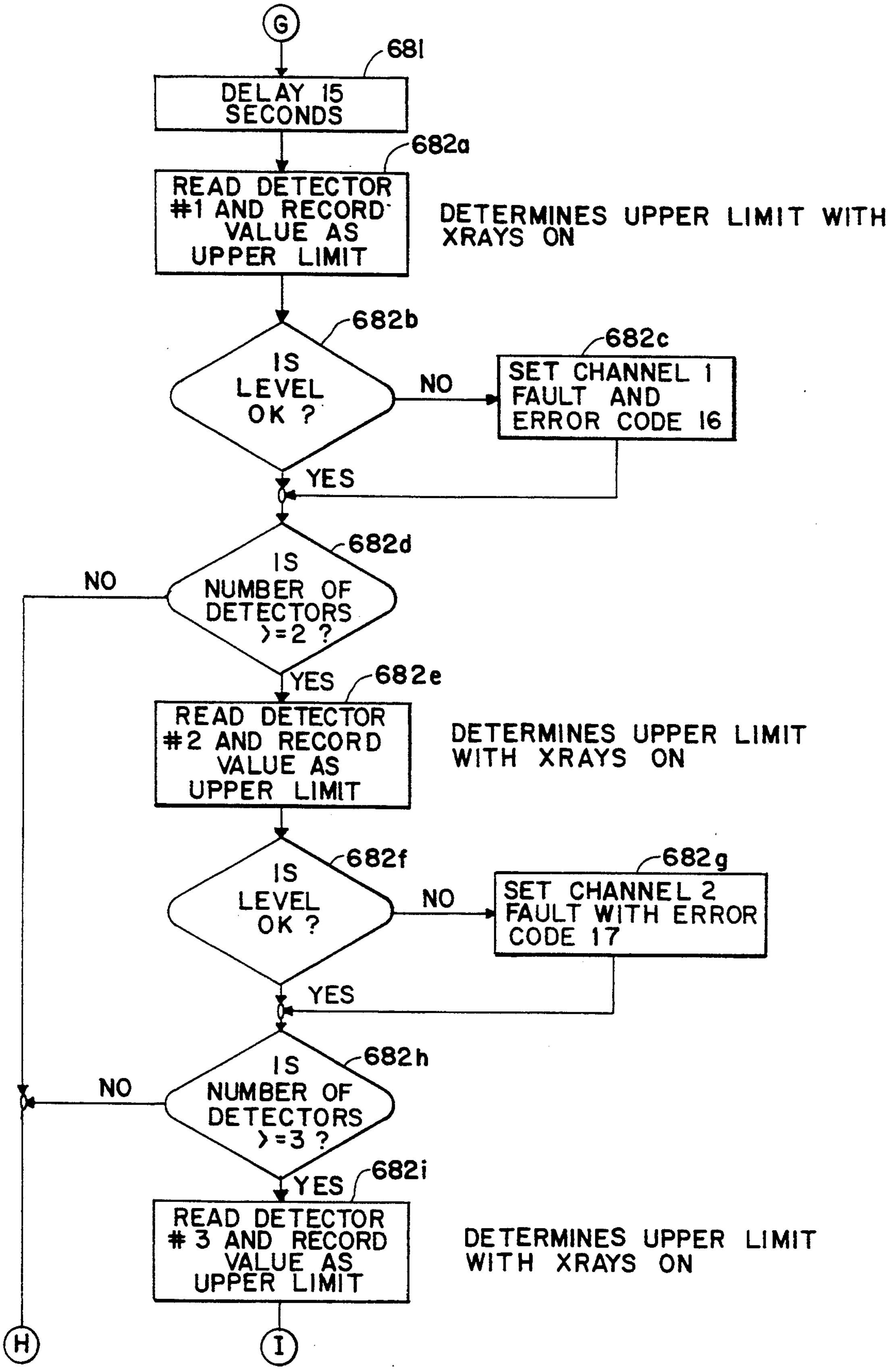
Figure 6G:
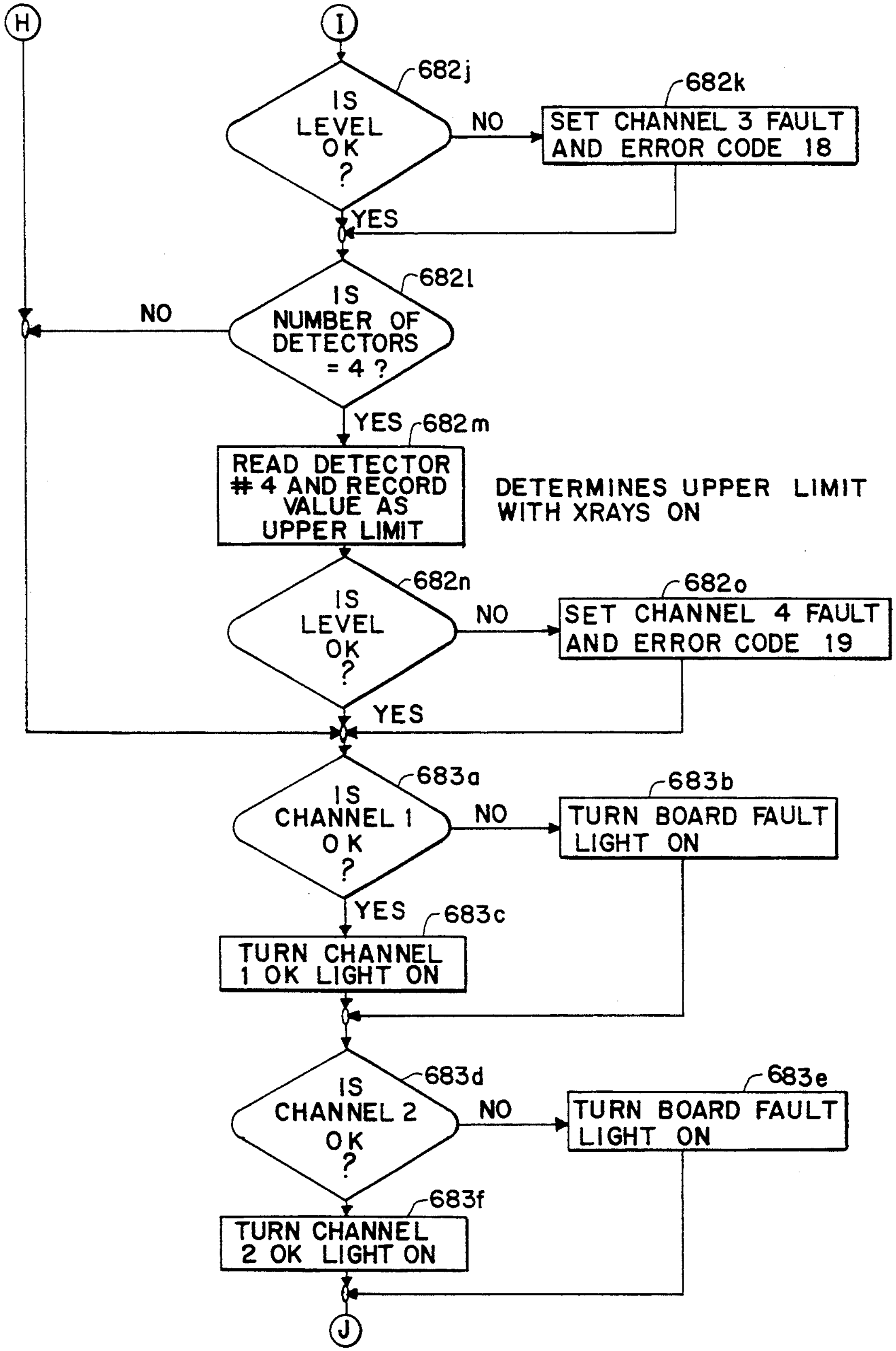
Figure 6H:
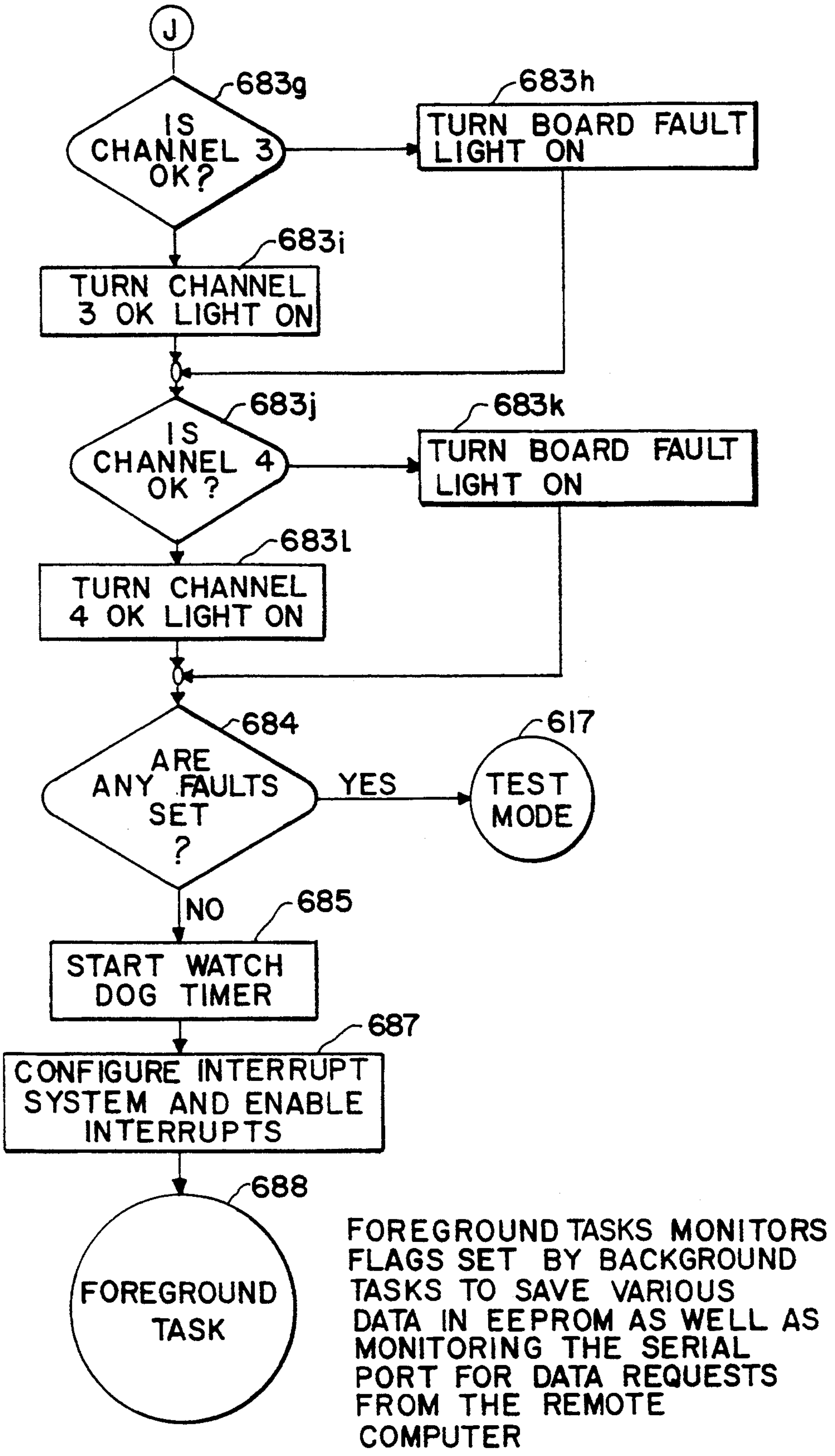

The block diagram in FIG. 5 illustrates that external inputs are provided by detectors 501 to detector signal conditioning and amplification circuits 503 in analog section 505. Detector sample and hold circuits 507 sample and hold the outputs of the detector signal conditioning and amplification circuits 503. Sample and hold circuits 507 provide the conditioned signals to the analog multiplexer 509. As FIG. 5 illustrates, each channel has its own detector and sample and hold circuit. Multiplexer 509 operates under the control of microcontroller 513, which resides in digital section 515. In response to microcontroller 513, analog multiplexer 509 delivers one of the channel detector outputs to the A to D converter 511. The digitized output from the A to D converter 511 is provided to microcontroller 513. It should be noted that microcontroller 513 also controls the sampling performed by sample and hold detectors, as shown by signal line 517. Signal line 517 also transmits information from microcontroller 513 to the pressure sensor sample and hold devices 519. These pressure sensor sample and hold circuits are used to sample the operation of the air valve pressure sensors 521 as buffered by signal conditioning circuits 523. The outputs of sample and hold circuits 519 are transmitted to microcontroller 513, as illustrated in FIG. 5. Microcontroller 513 also communicates in a bi-directional manner with three memory devices. EEPROM 525 stores system parameters. EPROM 527 stores a program which operates microcontroller 513. RAM 529 stores digitized data. It should be noted that the microcontroller operates channel OK indicators 531. Output section 533 contains air valve drivers 535 which are operated by outputs by the microcontroller 513. The air valve drivers are used to control the air ejection mechanisms to provide air pressure that is used to eject material into the correct bin after material has been irradiated and scanned by the detectors. FIG. 15 also illustrates several auxiliary functions. One is system shut down output 537 and another is serial communications interface 539, which can be routed to a monitor computer. In addition, manual fire switch debounce logic 541 can also be used to manually active the air valve drivers 535 by activation of the corresponding fire channel switch 543.

Figure 12:
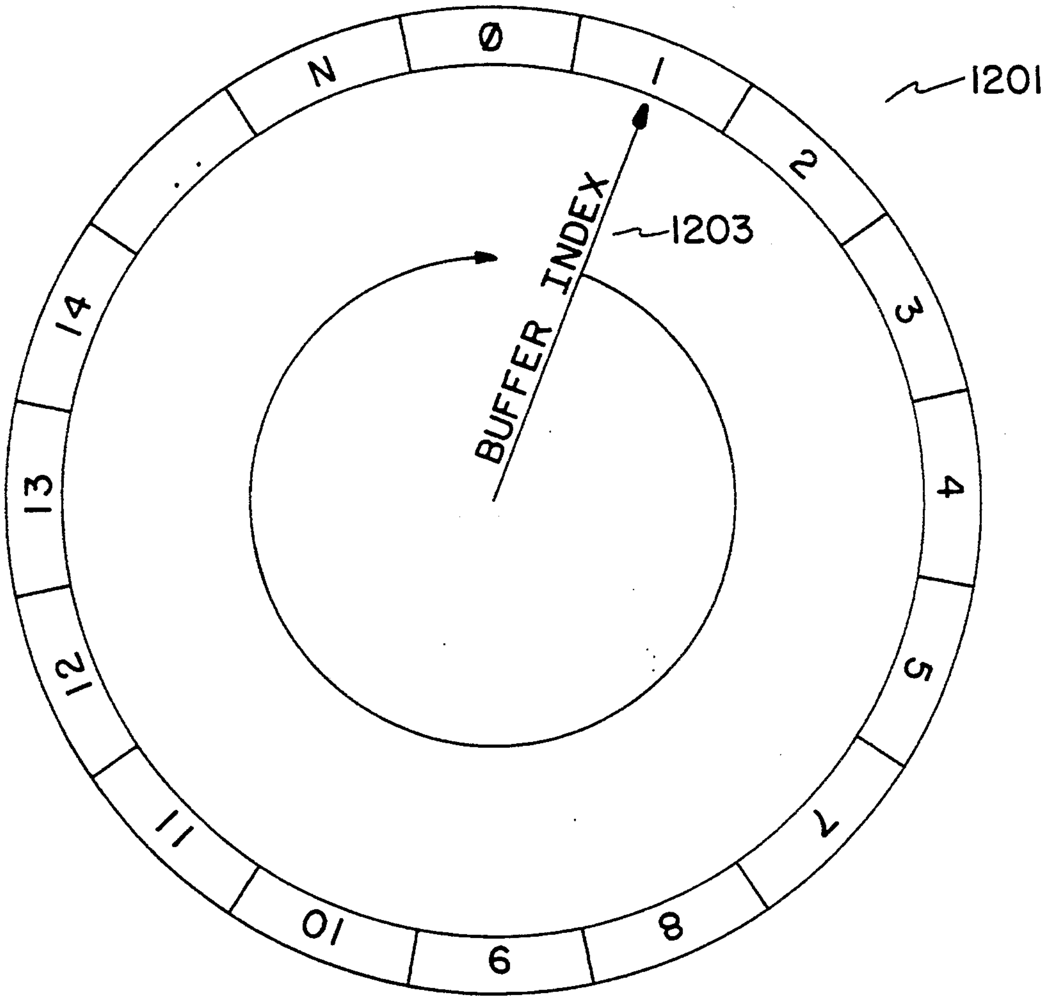
FIG. 12 illustrates a circular buffer as used in the invention.

The detector software such as that resident on a remote detector board, utilizes circular buffers to store data. Each channel uses two circular buffers. One is used to store the data for detectors while the other is used to store data for the pressure transducers. A circular buffer 1201 having N positions is shown in FIG. 12.

At initialization the buffer index 1203 is set to point to buffer position 0. When the first data point is read, it is stored in position 0. The buffer index 1203 is then incremented to the next buffer position. Widen the next data point is read, the data is stored in the circular buffer at the position indicated by the buffer index. Again the buffer index is incremented to the next buffer position. This process continues until the buffer index reaches the end of the buffer (position N). At this time the buffer index is set to position 0. This is effect creates a first-in-first-out circular buffer that maintains a history of the most recent N data points which are used by the detect/eject algorithm to determine plastic types, as described herein.

The circular buffer 1201 is also used to indicate relative points in time. This is critical to the proper timing of eject and pressure measurement events. When used as a relative time clock, the buffer index 1203 is analogous to the minute hand on a clock. Events are scheduled to occur at specific points in the buffer, just as one might schedule an event, for example, at 15 minutes after the hour. When the buffer index 1203 points to the scheduled position, the event is performed. This is how the air-on and air-off indices are handled. Once it has been determined that material is to be ejected, the specific point in time to cause the ejection is calculated using the methods shown in the flowcharts of FIGS. 6–11. This point is marked on the circular buffer (relative time clock) as the air-on index. Once the air-on index is determined, the air-off index is calculated and likewise marked in the circular buffer. When the buffer index points to the buffer position marked as the air-on index, a solenoid valve is energized to initiate the flow of air used to eject material. When the buffer index points to the buffer position marked as the air-off index, the solenoid valve is deenergized, interrupting the flow of air. Of course, this method could be employed to activate and deactivate any material ejection mechanism. In addition, the circular buffer can be used as an index for any relatively timed events in the system.

Thus, the circular buffer used by the detector board software is designed to store the most recent N data points measured, as well as function as a relative time clock to schedule events accurately. The use of the circular buffer provides an efficient method of handling data storage and time scheduling activities, which can be very intensive if implemented using other conventional approaches.

As previously mentioned, a processor, such as microcontroller 513, can be used to direct operation of the system. In the initialization sequence shown in FIGS. *6a–6h* the system can be checked so that overall system operation or individual channel operation can be verified and appropriate indicators illuminated. Steps 601 and 603 initialize processor functions and variables, respectively. To assure that the program code is operational, a checksum test is performed in step 605. Since the correct program code is necessary for system operation, if step 607 determines that the checksum test was not passed, control is routed to block 609, which causes all the channel OK lights to blink on and off permanently until the error is corrected. Assuming the checksum test did pass, then a read/write test is performed on a first portion of random access memory in step 611. This assures that the first 8K of the RAM is operational. If the test does not pass as determined in step 613, an error code 4 is set in step 16 and the test mode is entered in step 617. If the test did pass, then the second RAM is subjected to a read/write test in step 619. If this test does not pass, then step 621 sets a different error code in step 623 and the test mode in step 617 can again be entered.

The system can operate in two modes. In the first mode, the detectors are independent, while in the second mode the detectors are paired for the purpose of measuring the speed of the objects on the conveyor. The mode can be set by a DIP switch whose position is read in step 625. In step 627 a number of detectors variable is set as required by the switch setting. If step 629 determines that the detectors are not independent, step 631 sets the variable indicating the detectors are paired to measure speed. In this case, detectors 1 and 2 are paired, detectors 3 and 4 are paired, etc. On the other hand, if the detectors are independent, the variable is set indicating the detectors are independent as indicated in step 633.

As previously indicated, the number of detectors and the number of pressure transducers is typically the same. FIG. *6b* shows that positions 1-2 of the DIP switch indicate the number of detectors connected to the board. Switch positions 3 and 4 determine the number of pressure transducers connected to the board. The number of pressure transducers must be equal to the number of detectors, unless the detectors are not independent, in which case more than one detector is used to activate an ejection mechanism. It is also possible to combine multiple detection channels into a single ejection channel. Thus, in step 635 the number of pressure transducers is set as required by the switch setting.

In step 637, the controller determines if the test mode is selected. If this is the case, test mode is entered as step 617. If not, in step 639 the input to detector number 1 is read and recorded as a lower limit. This is done with the electromagnetic radiation source (e.g., X-ray source) turned off. If the level is not correct as determined in step 641, a channel fault flag and corresponding error code is set as shown in step 643. In step 645, the number of detectors is tested to determine if the detectors have been exhausted. Steps 646–656 illustrate corresponding steps performed for four channels. As previously mentioned, any number of channels can be implemented. It should also be noted that an error code corresponding to a failure in a particular channel can be set.

Step 657 illustrates that a next step in the initialization sequence is determining if the reference amplitude for the A/D converter is correct. If this is not the case, as determined in step 658, an error code is set in step 659 and the test mode is entered via step 617. If the amplitude is correct then, in step 660, the controller commands the input of the first pressure transducer to be read and recorded as a lower limit. If the level is not correct as determined in step 661, then an error code for that channel is set in step 662 and step 663 tests to determine if the number of transducers has been exhausted. Steps 664 through 674 perform corresponding tests for the remaining channels.

If step 675 determines that any faults are set, then the channel OK lights for channels without faults are activated in step 676 and test mode is entered via step 617. If no faults have been set, then the board fault light is turned off in step 677 to allow system initialization to continue and to permit activation of the electromagnetic radiation source.

Steps 678–680 are used to determine if a request has been received from a remote computer to turn the electromagnetic radiation source on and if the request has been processed. Step 678 checks to see if the electromagnetic radiation source has been turned on. If it has, control is passed to step 681. If the source has not been turned on, a serial interface is checked to see if a request has been made by the monitor or master computer for data from the board. Control is transferred from step 678 to 679 and 680 until the output of step 678 indicates that the electromagnetic radiation source should be turned on. When this occurs, step 681 activates a fifteen second delay. With the X-rays on, step 682*a* reads detector number 1 and records the value read as an upper limit. Step 682*b* tests if this level is OK. If not, step 682*c* indicates a fault and sets a corresponding error code for the channel. Step 682*d* then determines if the number of detectors has been exhausted. Steps 682*e*–682*o* perform the same steps for each of the channels until the channels are exhausted. The processor then checks to determine in step 683*a* if any faults have been indicated in channel 1. If so, the corresponding fault light is turned on in step 683*b*. If not, the channel OK light is turned on in step 683*c*. This process is repeated until the channels are exhausted, as illustrated in steps 683*d*–683*l*.

Step 684 then queries if any faults have been set. If so, the test mode is entered at step 617. If not, step 685 sets a watch dog timer, which is used as a timing mechanism to verify the system does not become idle or (hang up) for any period of time.

Control then passes to step 687 which configures the interrupt system and enables the interrupts. As discussed below, the system is an interrupt driven system which employs a timing routine which activates interrupts to perform specific functions at specific times.

Step 688 performs the foreground task which is used to monitor flags set by various tasks, to save data in the EEPROM and to monitor the serial port for data requests from a remote computer.

Figure 10:
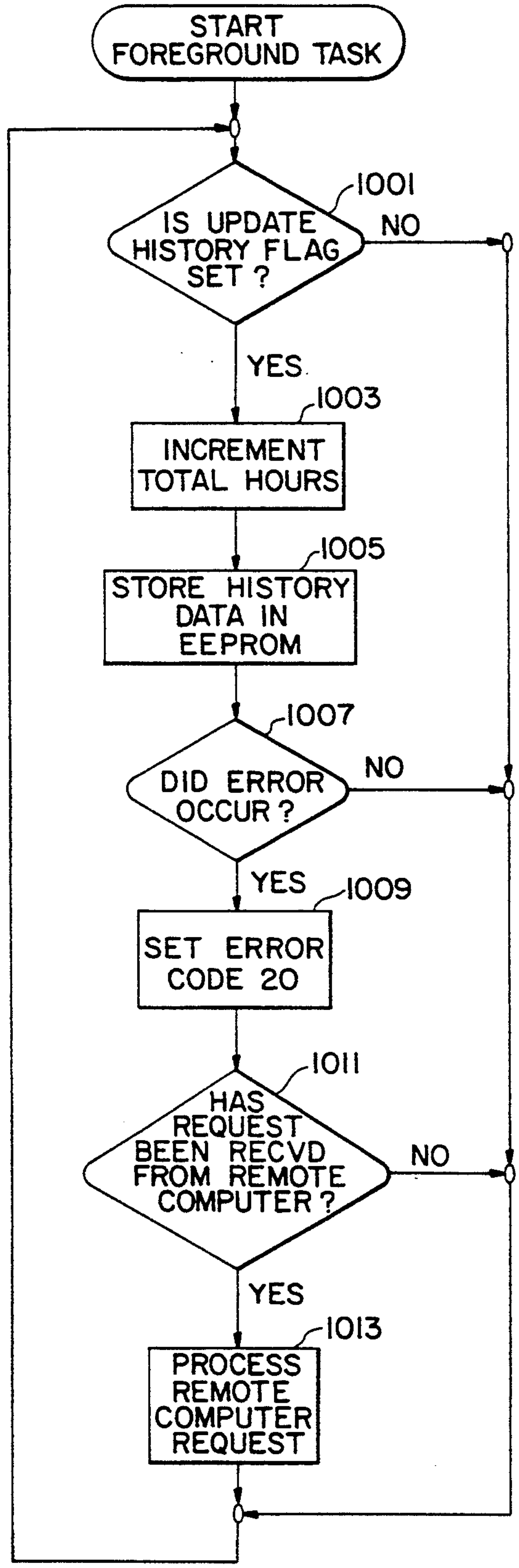
FIG. 10 illustrates the steps performed in a foreground routine in a system according to the invention.

The foreground task is illustrated in FIG. 10. As just discussed, the primary functions of the foreground task are to monitor flags, errors and requests received from a remote computer. Step 1001 indicates that the only entry to the foreground task is through the update history flag. The foreground task monitors this flag to determine when the foreground task will perform the remaining steps. Thus, if the update history flag has not been set, control merely passes back to the same step 1001 and the flag is checked again.

Periodically, the update history flag is set. When this occurs, the total number of hours will be incremented in step 1003 and history data stored in EEPROM as shown in step 1005. If no errors have occurred, as determined in step 1007, the foreground task is complete. If an error has occurred, error code 20 is set in step 1009. Step 1011 then determines if a request had been received from the remote computer. If this is not the case, processing is complete. If a request has been received from the remote computer, then that request is processed in step 1013 and the foreground task is complete.

As previously indicated, the system is interrupt driven from a timer routine. FIGS. 7*a*–7*d* illustrate the steps in the timer interrupt routine which form the heart of system control. An interrupt occurs every one millisecond. Thus, step 701 resets the one millisecond timer. Next, the watchdog timer is reset in step 702. Step 703 tests to determine if the electromagnetic radiation source is being commanded to generate radiation. If not, step 704 determines if the electromagnetic radiation source has just been turned off. If this is the case, the update history flag is set in step 705, which will cause activation of the foreground routine as previously discussed. If this is not the case or when step 705 has set the history flag, control is transferred via step 706.

Figure 7A:
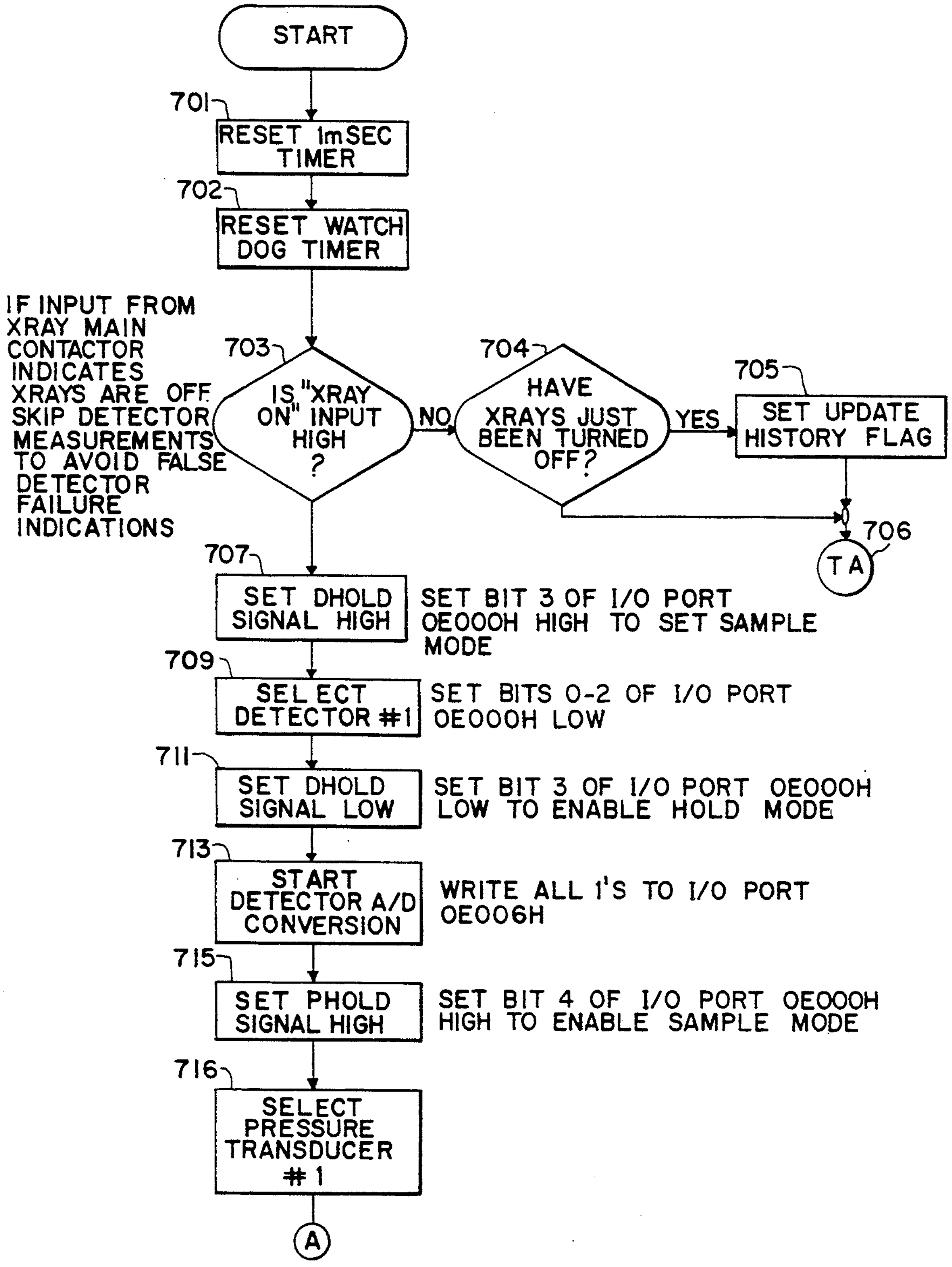
FIGS. 7*a*–7*d* illustrate the steps performed in a timer interrupt routine for a system according to the invention.
Figure 7B:
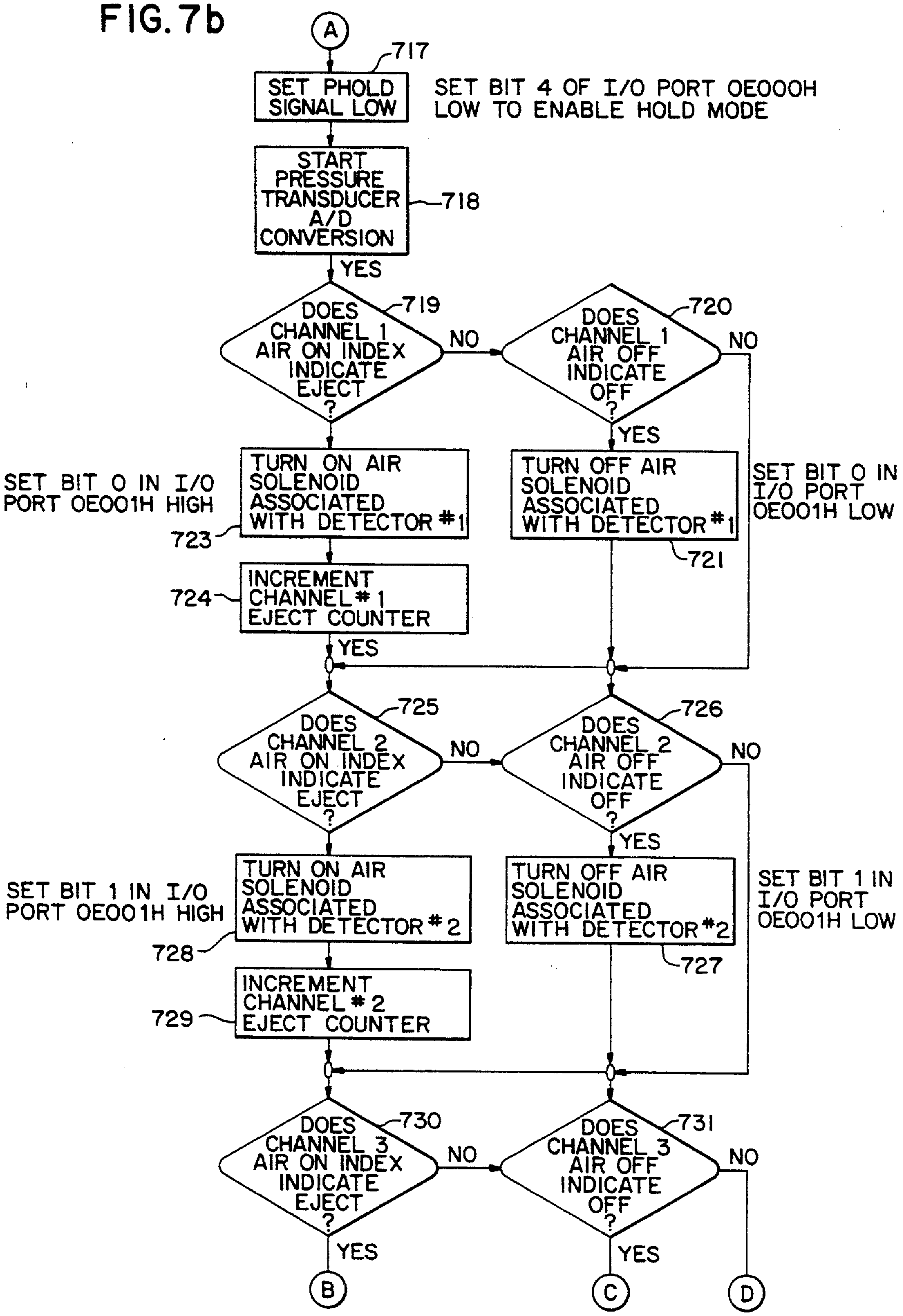
Figure 7C:
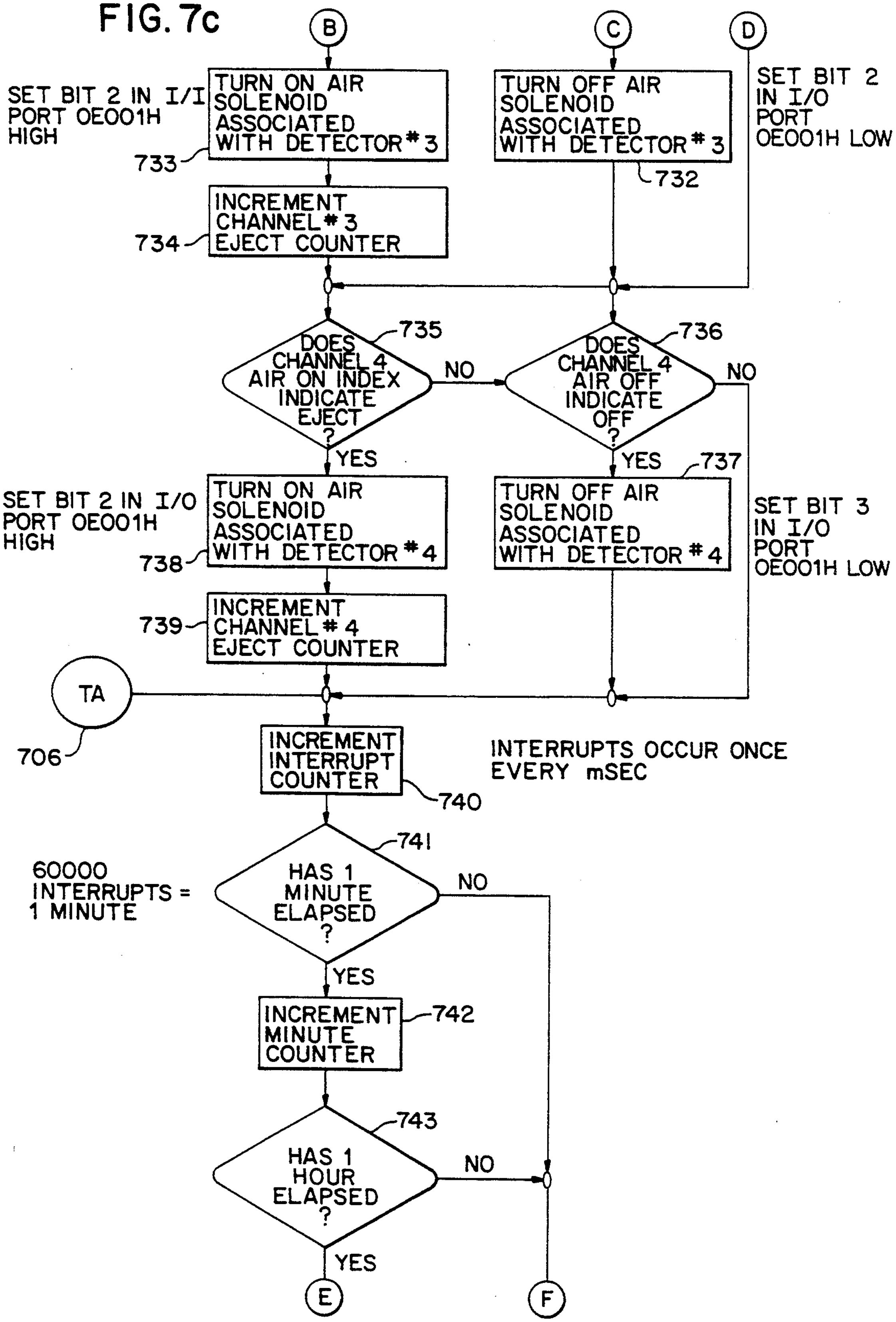
Figure 7D:
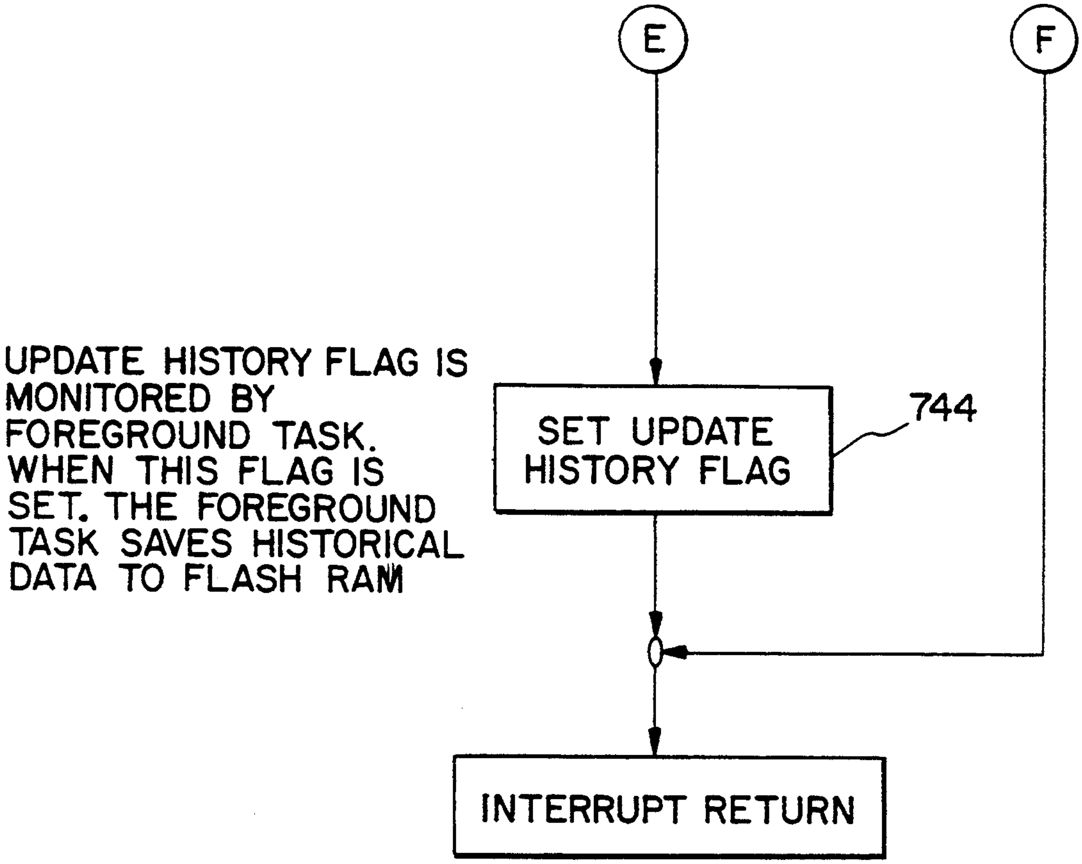

If the electromagnetic radiation source is being commanded to generate, e.g. X-rays, then a detector hold signal on signal line 517 is set high to activate the sample mode. FIG. 7*a* indicates that this can be accomplished by setting bit 3 of a I/O port of microcontroller 513. However, any other means known to those of ordinary skill would also be acceptable and the notation in FIG. 7*a* is by way of illustration and not limitation. In step 709 microcontroller 513 commands analog multiplexer 509 to select detector number 1. In step 711 the hold signal is set low, which disables the sampling and enables the hold mode. This is accomplished by setting the same bit 3 of the I/O port to the low state. Microcontroller 513 next activates step 713 which causes A to D converter 511 to begin the A to D conversion of the output from multiplexer 509. This analog to digital conversion is discussed below in more detail relative to FIGS. 8*a* and 8*b*.

While the detector analog to digital conversion takes place, microcontroller 513 sets the pressure sensor hold signal high on line 517 in step 715. This enables the sample mode for the pressure transducers. In step 716, the pressure transducer is selected so that samples of the first pressure transducer are obtained. In step 717 the hold signal is set low so that the pressure transducer analog to digital conversion in step 718 can begin. The pressure transducer analog to digital conversion is discussed in more detail below relative to FIGS. 9*a* and 9*b*.

It should be apparent that the detector and pressure sampling and analog to digital conversions take place simultaneously. In a preferred embodiment, there is a 30 microsecond delay from the start of the detector analog to digital conversion in step 713 and the setting of the pressure sensor hold signal high to enable the sample mode in step 715. The processes continue in parallel. In the event that at the end of a cycle there is a conflict, priority is resolved for detector interrupts. However, the timer interrupt routine has highest priority.

Figure 8A:
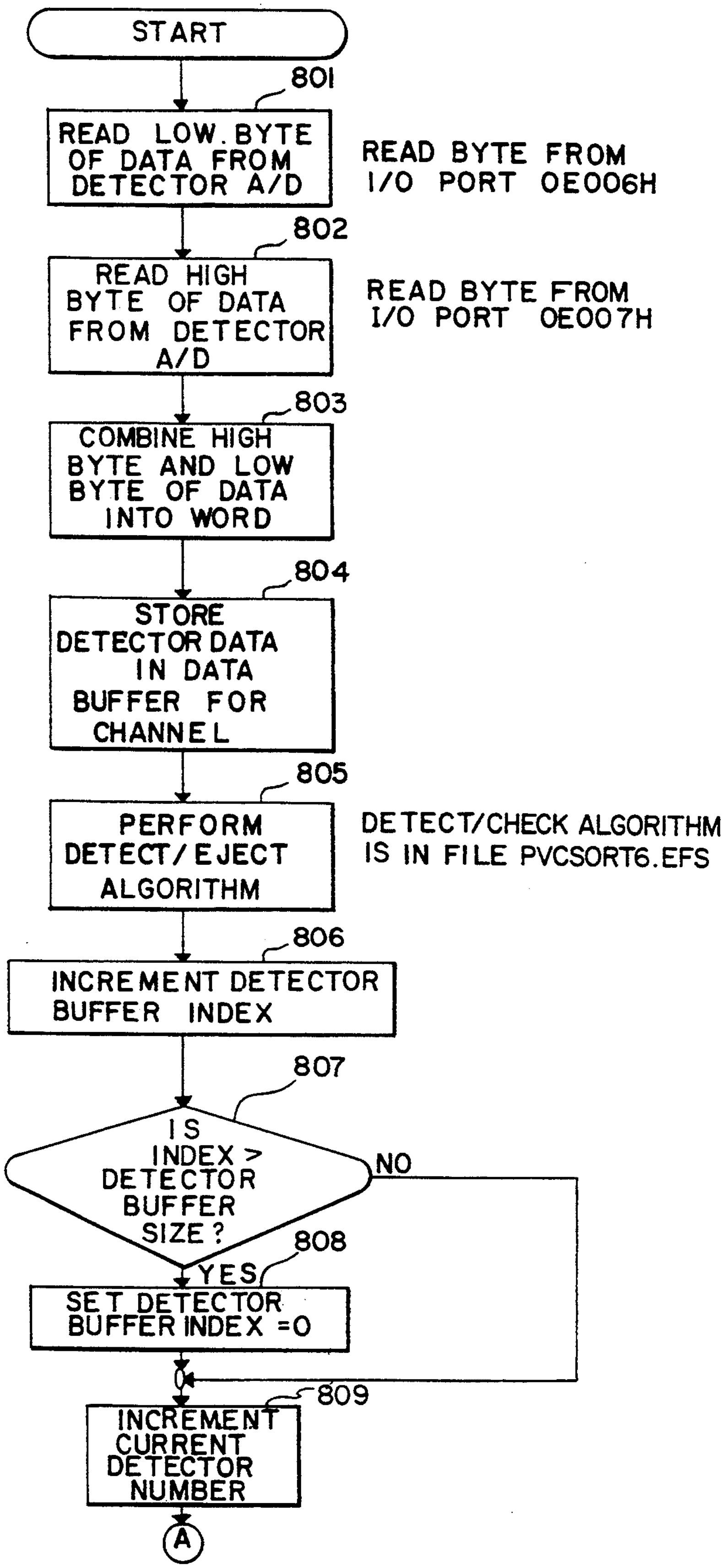
FIGS. 8*a*–8*b* illustrate steps performed in a detector analog to digital conversion interrupt routine in a system according to the invention.
Figure 8B:
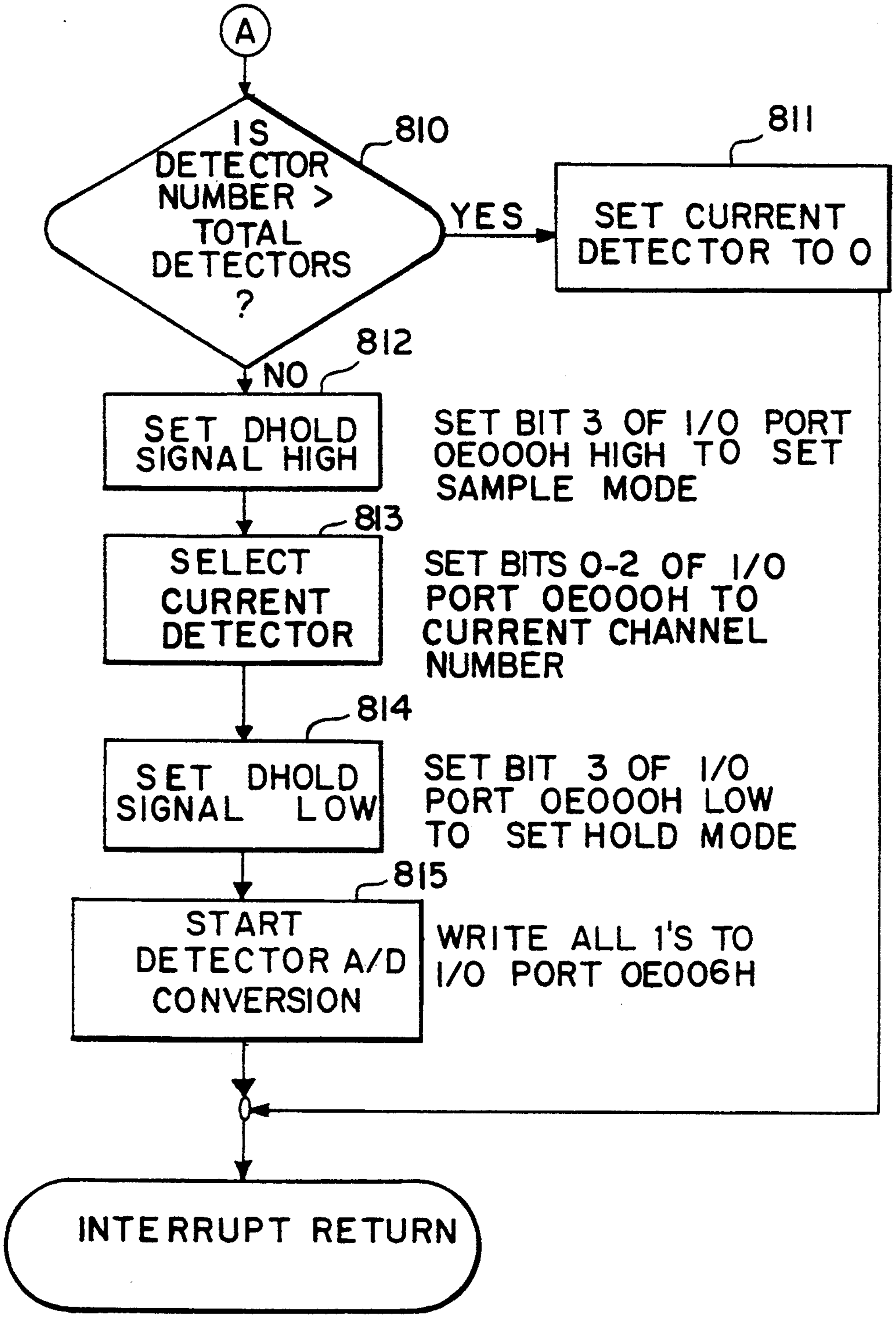

For convenience, before completing our discussion of the timer interrupt routine in FIG. *7b–7d*, we will next discuss the detector analog to digital interrupt routine in FIGS. 8*a*–8*b*. In steps 801 and 802, the low and high bytes are read from the detector analog to digital converter 511 and are respectfully combined into a single word 803. In step 804 the combined detector data is stored in a data buffer for that particular channel. Step 805 then transfers control to perform the detect/eject algorithm.

Figure 11A:
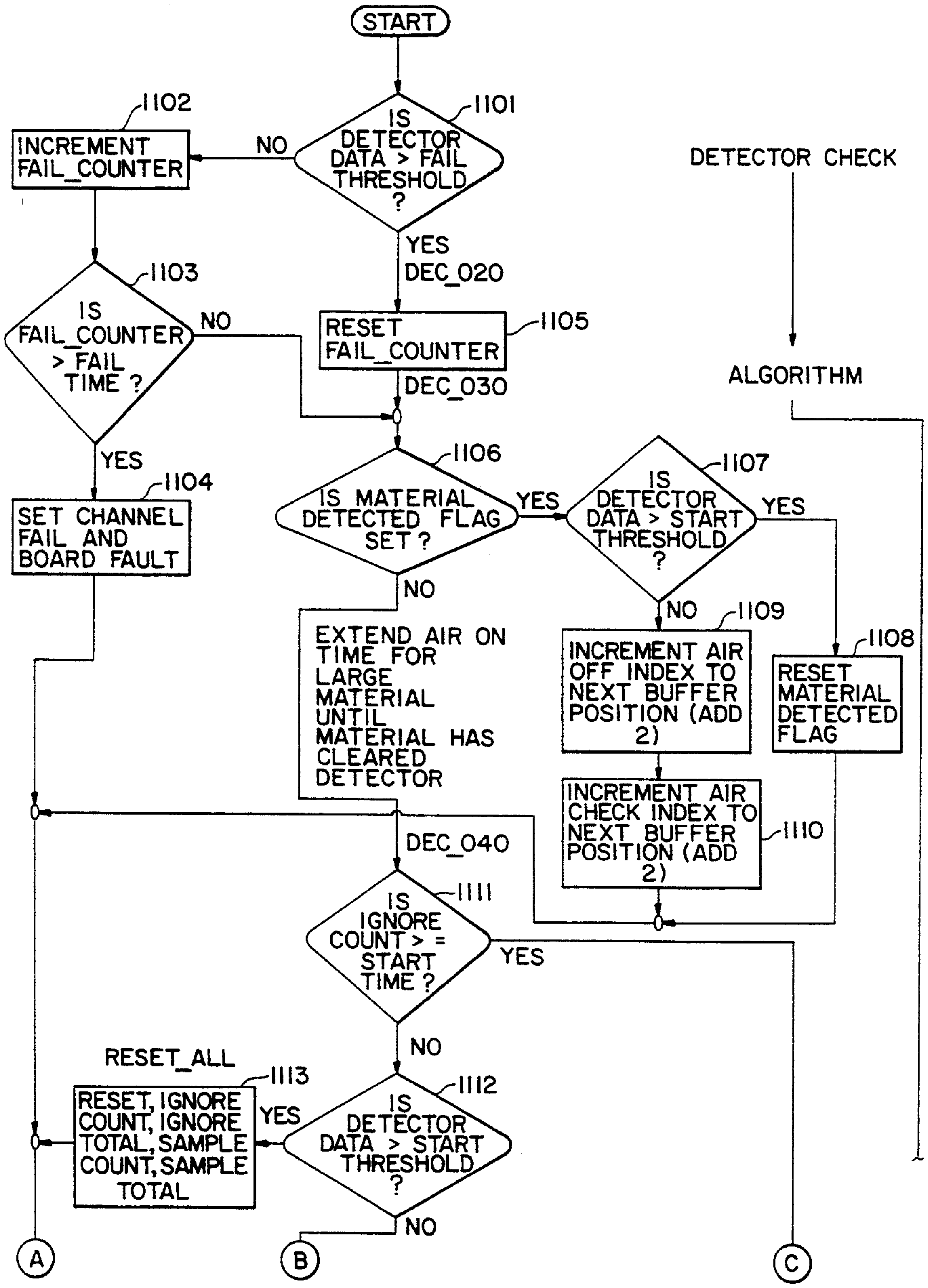
FIGS. 11*a*–11*c* illustrate steps performed in a detect/eject algorithm routine of a system according to the invention.
Figure 11B:
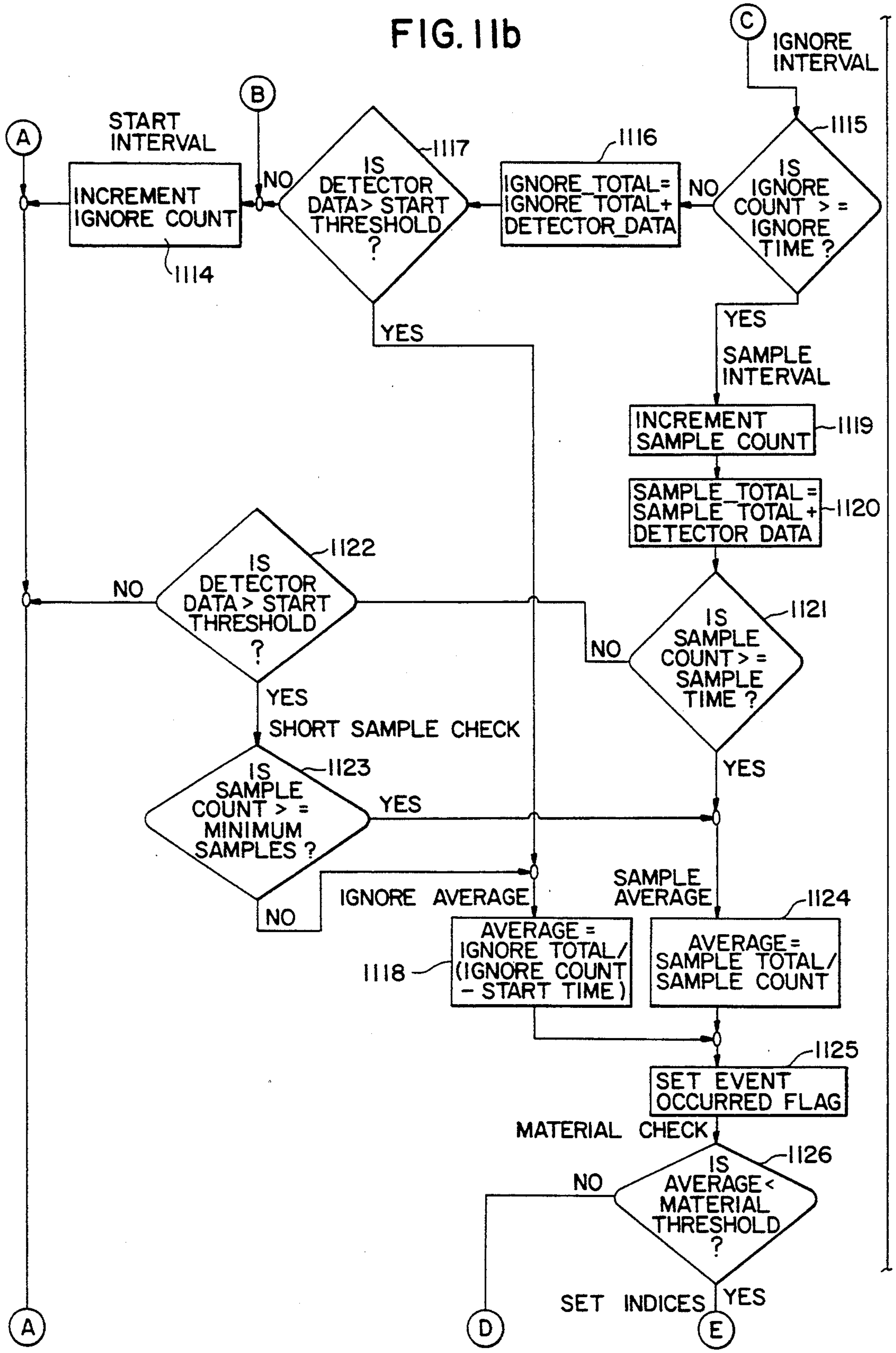
Figure 11C:
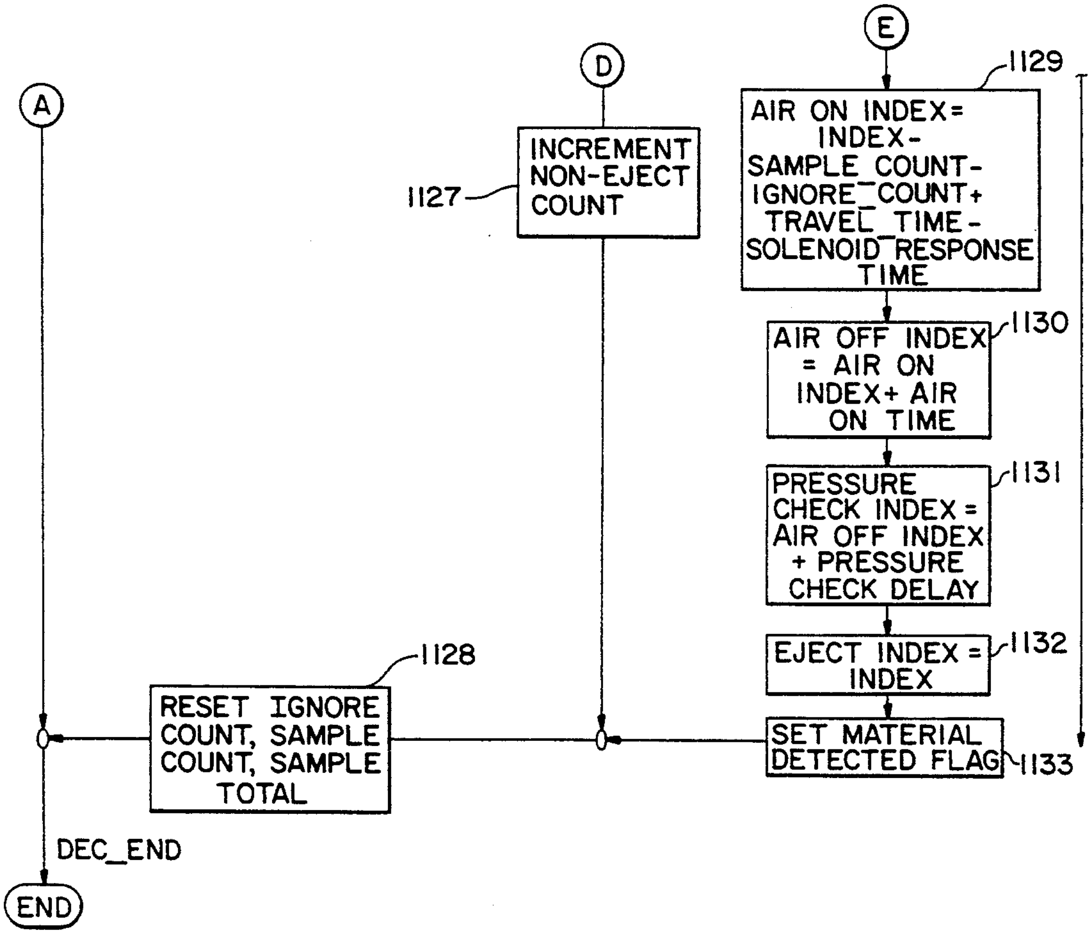

The detect/eject algorithm is illustrated in FIGS. 11*a*–11*c*. In step 1101, the detector data is tested to determine if it exceeds a predetermined fail threshold. If not, in step 1102 a fail counter is incremented and, in step 1103, the new value of the fail counter is tested against a predetermined fail time. If the fail counter exceeds the fail time, the a failure has been detected and step 1104 sets a fail and board fault for that particular channel. If the detected data exceeds the fail threshold in step 1101, then the fail counter is reset in step 1105.

Whether the fail counter is reset or the fail counter does not exceed the fail time, a material detected flag is tested in step 1106. If the material detected flag is set, the detector data is next tested against a start threshold in step 1107. If the detector data exceeds the start threshold, the material detected flag is reset in 1108 and the detect/eject algorithm is terminated. If the result of step 1007 is that the detector data does not exceed the start threshold then, in step 1109, an air off index is incremented to the next buffer position in step 1109. This is repeated in step 1110. The detect/eject algorithm is then terminated. In summary, if the material detected flag has been set, but the detector data is beneath the start threshold, a large unit of material has been detected and it is necessary to extend the air on time until the material has cleared the detector. Thus, the air off index is moved several positions forward, so that the air pressure ejection mechanism remains turned on for an additional period of time.

As previously discussed, it is necessary to ignore a portion of the material being detected. Thus, when the material detected flag is not set in step 1106, step 1111 determines if an ignore count is greater than or equal to a start time. If not, the detector data is tested to determine if it exceeds the start threshold in step 1112. If it does, the "reset all" step 1113 resets the ignore count, an ignore total, the sample count, and the sample count total, and the detect/eject routine is terminated. On the other hand, if the ignore count is not greater than or equal to the start time, as determined by step 1111, and the detector data does not exceed the start threshold, as determined by step 1112, step 1114 increments the ignore count and terminates the detect/eject algorithm.

When the ignore count is greater than or equal to the start time in step 1111, in step 1115, the ignore count is tested to determine if it is greater than or equal to a predetermined ignore time. If this is not the case, an ignore total is summed with its previous value and the detector data is tested to determine if it exceeds a start threshold in step 1117. If this is not the case, the ignore count is incremented in step 1114 and the detect/eject algorithm is terminated. If, on the other hand, the ignore count is greater than or equal to the start time, but is not greater than or equal to the ignore time, and the detector data exceeds the start threshold, then an ignore average is calculated in step 1117 to equal the ignore total divided by the difference between the ignore count and the start time.

If the ignore count is greater than or equal to the start time, as determined in step 1111, and greater than or equal to the ignore time, as determined in step 1115, a sample interval can begin. In step 1119, the sample count is incremented. The sample total is determined to be the previous sample total plus the detector data in step 1120. In step 1121 the sample count is tested against a predetermined sample time. If the sample count is not greater than or equal to the predetermined sample time, then in step 1122 the detector data is tested against the start threshold. If the detector data does not exceed the start threshold, the detect/eject algorithm is terminated. On the other hand, if the result of step 1122 is that the detector data is greater than the start threshold, a short sample check is initiated. In step 1123 the sample count is tested to determine if it is greater than or equal to the minimum number of samples. If this is not the case then an ignore average is calculated in step 1118, previously discussed.

If the sample count is greater than or equal to the minimum number of samples or, if in step 1121 the sample count is greater than or equal to the sample time, then a sample average is calculated in step 1124. The sample average is the sample total divided by the sample count.

Whether an ignore average is calculated in step 1118 or a sample average is calculated in step 1124, an event occurred flag is set in step 1125. A material check is then initiated. Step 1126 determines if the calculated average is less than a predetermined material threshold. If this is not the case, then a non-eject count is incremented in step 1127 and in step 1129 the variables ignore count, sample count, and sample total are reset. If the calculated average is less than the material threshold in step 1126, indices are then set. In step 1129 the air on index, which indicates when the ejection air will be turned on, is set to a value equal to the present index minus the sample count, minus the ignore count, plus the time required for the material to travel from the detector to the ejection mechanism, minus the response time for the solenoid to activate the ejection mechanism. In step 1130, an air off index is calculated to determine when the ejection air will be turned off. This is calculated to equal the sum of the air on index and the air on time. In step 1131, a pressure check index, which is used to determine the time when the air pressure will be checked, is calculated. The pressure check index is equal to the air off index plus the pressure check delay time. The eject index is then set to the current value of the index in step 1132 and, in step 1133, the material detected flag is set. The use of the material detected flag in step 1106 was previously discussed.

Upon completion of the routine to perform the detect/eject algorithm, control then returns to step 806 in which the detector buffer index is incremented. Essentially, the detector buffer index is an index to the circular data buffer. In step 807, if the index is greater than the detector buffer size, the detector buffer is set equal to zero in step 808 and, in step 809, the current detector number is incremented. Step 810 then tests to determine if the current detector number exceeds the total number of detectors. If this is the case, step 811 sets the current detector to zero and control returns to the timer routine at step 713.

If the incremented or next detector number does not exceed the total number of detectors, then step 812 sets the hold signal high to enable the sample mode for the incremented detector, which is now the current detector. Step 813 sets the current detector by setting the I/O port of microcontroller 513 to the current channel number. In step 814, the hold mode for the detector is set and step 815 starts the detector A to D conversion. It should be noted that the routine in FIGS. 8*a* and 8*b* is the detector analog to digital conversion interrupt routine. Thus, this routine will be executed, along with the detect/eject algorithm routine for each of the detector channels.

Figure 9A:
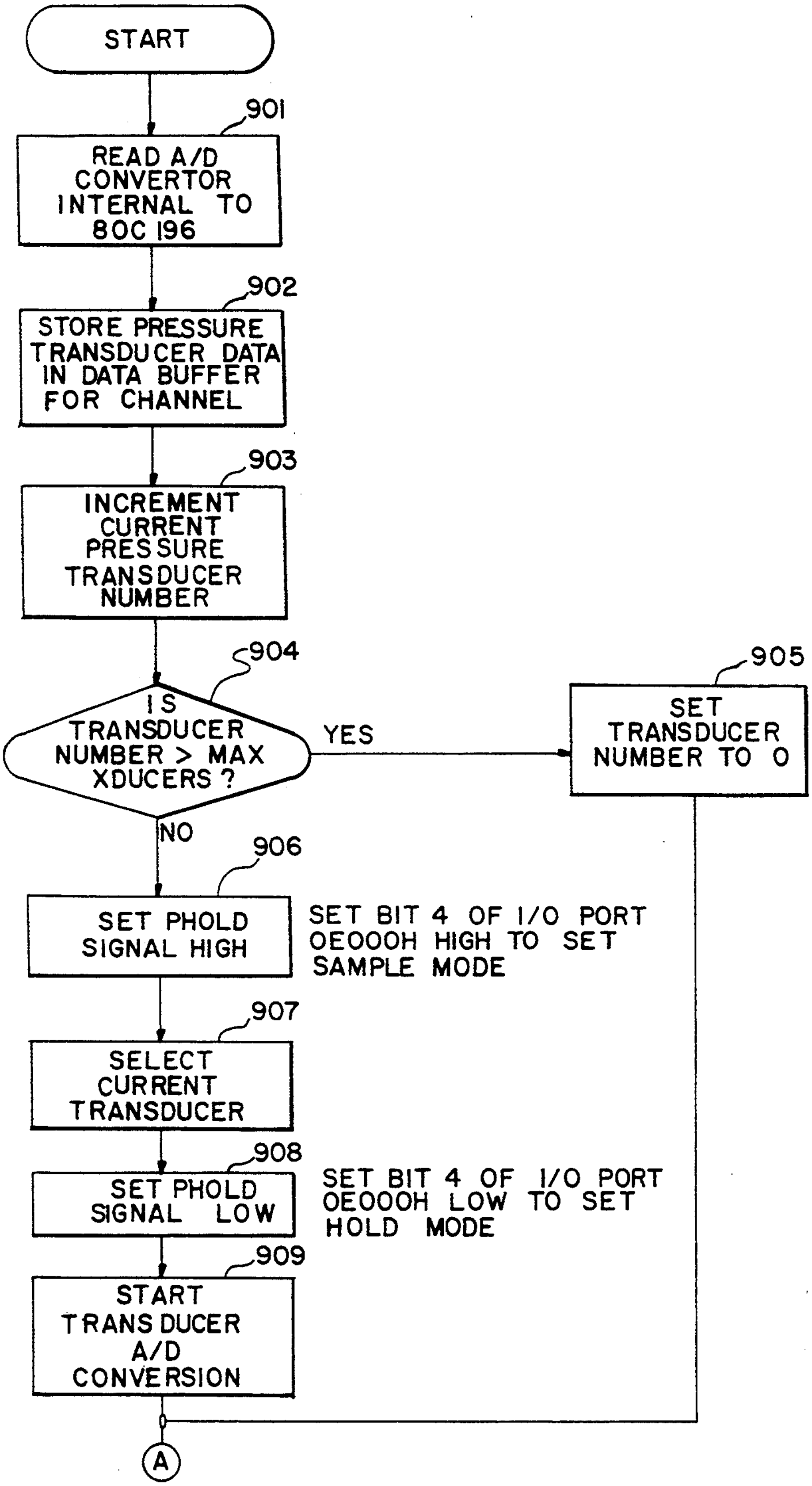
FIGS. 9*a*–9*b* illustrate steps performed in a pressure transducer interrupt routine in a system according to the invention.
Figure 9B:
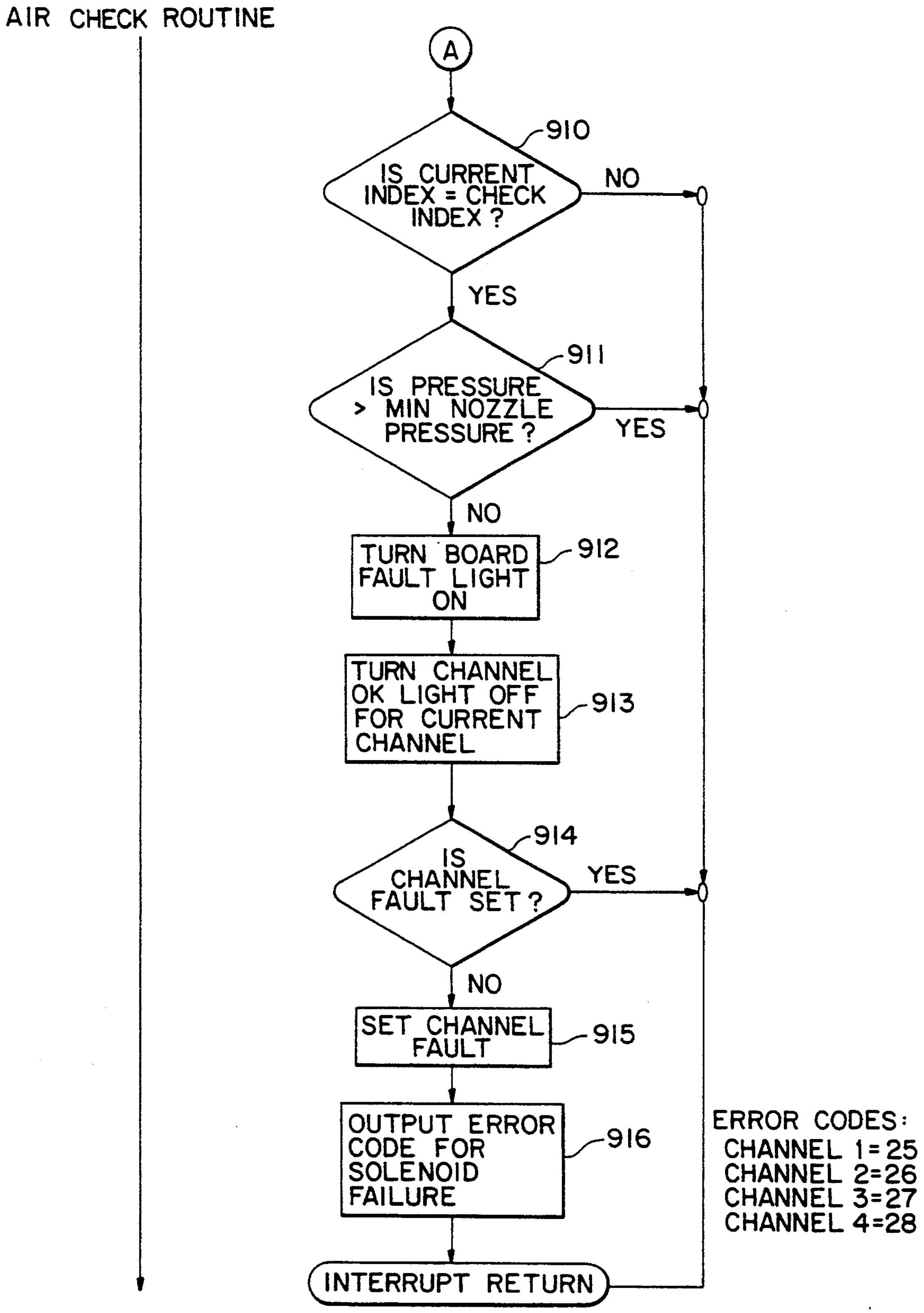

As previously discussed, in step 718 the pressure transducer analog to digital conversion is started. This routine is illustrated in FIGS. 9*a* and 9*b*. As FIG. 5 illustrates, the pressure sensor sample and hold circuits 519 for air valve pressure sensors 521 have outputs which are routed directly to microcontroller 513. Thus, step 901 involves reading an analog to digital converter which is internal to the microcontroller. In step 902 pressure transducer data is stored in a data buffer for the particular channel. In step 903 the current pressure transducer number is incremented so that data for the next channel is obtained. In step 904 the incremented transducer number is tested against the maximum number of transducers.

If the incremented transducer number exceeds the number of transducers, the transducer number is set to zero in step 905 and an air check routine, discussed below is performed. If the transducer number does not exceed the maximum number of transducers then the hold signal is set high for the new transducer number to set the sample mode for the next channel. This is done in step 906. In step 907, the current transducer is selected by microcontroller 513 and in step 908, the hold mode is selected for that channel. Step 909 starts the transducer A to D conversion. Thus, steps 901–904 are repeated.

The air check routine shown in FIG. 9*b* is performed for the current channel on each pass through the transducer interrupt routine, i.e., one channel is processed per pass through the transducer interrupt routine. In step 910 a current index is checked against a check index. If the current index does not equal the check index, control returns to the timer interrupt routine at step 718. If the current index is equal to the check index, then in step 911 the measured pressure is tested against the minimum nozzle pressure. If the measured pressure exceeds the minimum nozzle pressure, control is returned to the timer interrupt routine at step 718. If not, step 912 causes a fault indicator to be activated and step 913 causes the channel OK light for the channel corresponding to the current detector to be extinguished. Step 914 then tests to determine if the channel fault has been set. If this is the case, control returns to the timer interrupt routine in step 718. If not, step 915 sets the channel fault and step 916 outputs an error code for solenoid failure. FIG. 9*b* illustrates error codes for solenoid failures in channels 1–4.

After the error code is output, control can be returned to the timer interrupt routine. Following the pressure transducer A to D conversion in step 718, the timer interrupt routine transfers control to step 719 where the channel one air index is tested to determine if the index indicates ejection of material. If not, in step 720, the channel one air off index is tested to determine if it indicates ejection air should be off. If this is not the case, processing of the remaining channels continues. However, if the channel one air off index indicates the ejection air should be turned off in channel one, the air solenoid with the associated detector is turned off in step 721. If the channel 1 air on index indicates the ejection air should be turned on in step 719, step 723 activates the air solenoid associated with the corresponding detector and step 724 increments the channel eject counter. Steps 725–739 indicate the same process takes place in each of the four channels as that described in steps 719–724.

At the completion for all four channels, or as many channels as exist in the system, or after the history update flag has been set in step 705, or if the electromagnetic radiation source is turned off and has not been recently turned off, as in step 704, the timer interrupt routine executes step 740 to increment the interrupt counter. Since an interrupt occurs every one millisecond, sixty thousand interrupts occur in one minute. The elapse of one minute by the count of sixty thousand interrupts is determined in step 741. For each elapsed minute, step 742 increments a minute counter. Step 743 then tests to determine if an hour has elapsed. If this is the case, the update history flag is set as an indicator to the foreground task to update historical information. The foreground task is always monitoring this flag.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of separating materials having different electromagnetic radiation absorption and penetration characteristics, the method comprising the steps of:

a) conveying materials to be separated from at least one inlet toward at least one outlet through a source of electromagnetic radiation;

b) irradiating portions of the materials conveyed with the source of electromagnetic radiation;

c) periodically polling a sequence of detectors, the detectors corresponding to channels, said polling including sampling for a sample time with the detectors the electromagnetic absorption and penetration characteristics of the material portions radiated;

d) in response to electromagnetic radiation absorption and penetration characteristics measured by the detectors in step c), activating a plurality of material ejection mechanisms at different times as the materials are conveyed, so that materials having different electromagnetic radiation and penetration characteristics are ejected at different times and locations on the conveyor into different sorting bins; and e) during step d) verifying the operation of the material ejection mechanisms.

2. The method recited in claim 1 wherein each channel has at least one ejection mechanism.

3. The method recited in claim 1 wherein each channel has at least one the ejection mechanism, the ejection mechanisms being comprised of air pressure ejectors and wherein step d) comprises:

i) measuring and storing air pressure data from each ejection mechanism in a sequence identical to the sequence of the detectors polled;

ii) indicating a fault if the air pressure data measured and stored in step a) is less than a predetermined minimum.

4. The method recited in claim 1 wherein a leading edge portion of each item of material to be separated in each channel is ignored.

5. A method of separating materials having different electromagnetic radiation absorption and penetration characteristics, the method comprising the steps of:

a) conveying materials to be separated in from at least one inlet toward at least one outlet through a source of electromagnetic radiation;

b) irradiating portions of the materials conveyed with the source of electromagnetic radiation;

c) periodically polling a sequence of detectors, the detectors corresponding to channels, said polling including sampling for a sample time with the detectors the electromagnetic absorption and penetration characteristics of the material portions radiated wherein an ignore table is counted from the time when a detection is made and wherein sampling taking place during the ignore time is ignored; and d) in response to electromagnetic radiation absorption and penetration characteristics measured by the detectors in step c), activating a plurality of the material ejection mechanisms at different times as the materials are conveyed, so that materials having different electromagnetic radiation and penetration characteristics are ejected at different times and locations on the conveyor into different sorting bins.

6. The method recited in claim 5 wherein in step c) outputs of the detectors are sampled a plurality of times during a sample interval and a sample average is determined from the detector outputs and a count of the number of samples during the sample interval.

7. The method recited in claim 6 wherein the average is compared to a predetermined material threshold defined by a ratio of a predetermined amount of radiation transmitted through a material to an amount of radiation transmitted in the absence of the material.

8. The method recited in claim 7 wherein the ejection mechanisms are air pressure ejection mechanisms and wherein, when the average is less than the predetermined material threshold, step d) further comprises setting an air on index to activate the air ejection mechanisms at a time and for a duration based on the sample count, the ignore count, a travel time for the material to go from the detectors to the air pressure ejection mechanism and a response time of a solenoid which activates the individual air ejection mechanisms.

9. The method recited in claim 8 wherein the air on index is determined from a current index as:

$$\text{Index} - (\text{Sample Count} - \text{Ignore Count}) + (\text{Travel Time} - \text{Solenoid Response Time})$$

10. The method recited in claim 8 wherein an air off index is defined as a sum of the air on index and the air on time and is used to turn the air ejection mechanisms off.

11. The method recited in claim 10 wherein step d) comprises:

i) measuring and storing air pressure data from each ejection mechanism in a sequence identical to the sequence of the detectors polled; and ii) indicating a fault if the air pressure data measured and stored in step a) is less than a predetermined minimum.

12. The method recited in claim 11 wherein a pressure check index is defined as a sum of the air off index and a pressure check delay and is used to activate verification of the air pressure data in each ejection mechanism.

13. The method recited in claim 5 further comprising an initialization sequence wherein:

variables are initialized and checked via a checksum routine;

detectors and ejection mechanisms are compared for correspondence;

low and high limits of detectors and ejection mechanisms are tested; and operation of fault indicators is verified.

14. The method recited in claim 5 wherein a foreground routine is performed, the foreground routine monitoring total operation time, recording errors and storing histories.

15. The method recited in claim 14 wherein the foreground routine is periodically interrupted to store processing histories.

16. The method recited in claim 5 wherein control is maintained by a current index representing a pointer in a circular buffer, the index being a location where current information is stored.

17. The method recited in claim 5 wherein each channel has at least one detector and at least one ejection mechanism.

18. The method recited in claim 5 wherein detections from a plurality of channels of detectors are combined to activate a same one of the ejection mechanisms.

19. An apparatus for separating materials having different electromagnetic radiation absorption and penetration characteristics, the apparatus comprising:

a) a conveyor arranged to convey materials to be separated from at least one inlet toward at least one outlet;

b) an electromagnetic radiation source arranged along said conveyor to irradiate portions of the materials conveyed;

c) a plurality of detectors, the detectors corresponding to channels, the detectors measuring electromagnetic absorption and penetration characteristics of the material portions radiated;

d) means for periodically polling a sequence of detectors, said polling means including a sampler arranged to sample the detectors for a sample time;

e) a plurality of ejection mechanisms, at least one ejection mechanism corresponding to each outlet;

f) means for activating the material ejection mechanisms at different times as the materials are conveyed, in response to electromagnetic radiation absorption and penetration characteristics measured by the detectors, so that materials having different electromagnetic radiation and penetration characteristics are ejected at different times and locations on the conveyor into different sorting bins; and g) means for verifying operation of the material ejection mechanisms during time period when the detectors are measuring electromagnetic absorption and penetration characteristics of the material portions radiated.

20. The apparatus recited in claim 19 wherein each channel has at least one ejection mechanism, the ejection mechanisms being comprised of air pressure ejectors, the apparatus further comprising:

f) means for measuring and storing air pressure data from each ejection mechanism in a sequence identical to the sequence of the detectors polled; and g) fault indicators indicating a fault if the air pressure data measured and stored is less than a predetermined minimum.

21. The apparatus recited in claim 19 comprising means for ignoring a leading edge portion of each item of material to be separated in each channel.

22. An apparatus for separating materials having different electromagnetic radiation absorption and penetration characteristics, the apparatus comprising:

a) a conveyor arranged to convey materials to be separated from at least one inlet toward at least one outlet;

b) an electromagnetic radiation source arranged along said conveyor to irradiate portions of the materials conveyed;

c) a plurality of detectors, the detectors corresponding to channels, the detectors measuring electromagnetic absorption and penetration characteristics of the material portions radiated;

d) means for periodically polling a sequence of detectors, said polling means including a sampler arranged to sample the detectors for a sample time;

e) an ignore time counter, said ignore time counter counting from a time when a detection is made to a later time defining the ignore time and wherein sampling taking place during the ignore time is ignored; and f) a plurality of ejection mechanisms, at least one ejection mechanism corresponding to each outlet; and g) means for activating the material ejection mechanisms at different times as the materials are conveyed, in response to electromagnetic radiation absorption and penetration characteristics measured by the detectors, so that materials having different electromagnetic radiation and penetration characteristics are ejected at different times and locations on the conveyor into different sorting bins.

23. The apparatus recited in claim 22 wherein outputs of the detectors are sampled a plurality of times during a sample interval and a sample average is determined from the detector outputs and a count of the number of samples during the sample interval.

24. The apparatus recited in claim 23 wherein the average is compared to a predetermined material threshold.

25. The apparatus recited in claim 24 further comprising an air on index and wherein the ejection mechanisms are air pressure ejection mechanisms and wherein, when the average is less than the predetermined material threshold the air on index is set to activate the air ejection mechanisms at a time and for a duration based on the sample count, the ignore count, a travel time for the material to go from the detectors to the air pressure ejection mechanism and a response time of a solenoid which activates the individual air ejection mechanisms.

26. The apparatus recited in claim 25 wherein the air on index is determined from a current index as:

$$\text{Index} - (\text{Sample Count} - \text{Ignore Count}) + (\text{Travel Time} - \text{Solenoid Response Time})$$

27. The apparatus recited in claim 25 wherein an air off index is defined as a sum of the air on index and the air on time and is used to turn the air ejection mechanisms off.

28. The apparatus recited in claim 27 comprising:

f) means for measuring and storing air pressure data from each ejection mechanism in a sequence identical to the sequence of the detectors polled; and g) fault indicators indicating a fault if the air pressure data measured and stored is less than a predetermined minimum.

29. The apparatus recited in claim 28 wherein a pressure check index is defined as a sum of the air off index and a pressure check delay and is used to activate verification of the air pressure data in each ejection mechanism.

30. The apparatus recited in claim 22 further comprising an initialization sequence means wherein:

variables are initialized and checked via a checksum routine;

numbers of detectors and ejection mechanisms are compared for one to one correspondence;

low and high limits of detectors and ejection mechanisms are tested; and operation of fault indicators is verified.

31. The apparatus recited in claim 22 further comprising means for performing a foreground routine wherein the foreground routine monitors total operation time, records errors and stores histories.

32. The apparatus recited in claim 31 wherein the foreground routine is periodically interrupted to store processing histories.

33. The apparatus recited in claim 22 comprising a circular buffer, wherein control is maintained by a current index representing a pointer in a circular buffer, the index being a location where current information is stored.

34. The apparatus recited in claim 22 wherein a plurality of detectors combine to activate a same one of the ejection mechanisms.

35. A method of separating materials having different electromagnetic radiation absorption and penetration characteristics, the method comprising the steps of:

a) conveying materials to be separated from at least one inlet toward at least one outlet through a source of electromagnetic radiation;

b) irradiating portions of the materials conveyed with the source of electromagnetic radiation at a selected energy level;

c) periodically polling a sequence of detectors, the detectors corresponding to channels, said polling including sampling for a sample time with the detectors at least one of absolute electromagnetic radiation absorption and penetration characteristics of the material portions radiated;

d) in response to the absolute electromagnetic radiation characteristics measured by the detectors in step c), activating a plurality of material ejection mechanisms at different times as the materials are conveyed, so that materials having different absolute electromagnetic radiation and penetration characteristics are ejected at different times and locations on the conveyor into different sorting bins.

* * * * *